US006856400B1

(12) United States Patent
Froggatt

(10) Patent No.: US 6,856,400 B1
(45) Date of Patent: Feb. 15, 2005

(54) APPARATUS AND METHOD FOR THE COMPLETE CHARACTERIZATION OF OPTICAL DEVICES INCLUDING LOSS, BIREFRINGENCE AND DISPERSION EFFECTS

(75) Inventor: Mark E. Froggatt, Blacksburg, VA (US)

(73) Assignee: Luna Technologies, Blacksburg, VA (US)

( * ) Notice: Subject to any disclaimer, the term of this patent is extended or adjusted under 35 U.S.C. 154(b) by 409 days.

(21) Appl. No.: 10/005,819

(22) Filed: Dec. 14, 2001

Related U.S. Application Data
(60) Provisional application No. 60/255,077, filed on Dec. 14, 2000.

(51) Int. Cl.⁷ .................................................. G01B 9/02
(52) U.S. Cl. ...................................... 356/477; 356/73.1
(58) Field of Search ................................. 356/477, 478, 356/484, 491, 73.1; 385/11, 12; 250/227.14, 227.19, 227.27

(56) References Cited

U.S. PATENT DOCUMENTS

| | | |
|---|---|---|
| 4,070,111 A | 1/1978 | Harrick |
| 4,241,997 A | 12/1980 | Chraplyvy |
| 4,259,016 A | 3/1981 | Schiffner |
| 4,389,090 A | 6/1983 | LeFevre |
| 4,397,551 A | 8/1983 | Bage et al. |
| 4,410,273 A | 10/1983 | Mantz |
| 4,506,388 A | 3/1985 | Monerie et al. |
| 4,674,872 A | 6/1987 | Wright |
| 4,678,333 A | 7/1987 | Anderson |
| 4,718,120 A | 1/1988 | Tzeng |
| 4,767,210 A | 8/1988 | Kashyap |
| 4,817,101 A | 3/1989 | Wyeth |
| 4,886,361 A | 12/1989 | Furstenau |

(List continued on next page.)

FOREIGN PATENT DOCUMENTS

| | | |
|---|---|---|
| EP | 1113250 A1 * | 7/2001 |
| JP | 6-34446 | 2/1994 |
| JP | 2001-41706 | 2/2001 |
| JP | 2001-91408 | 4/2001 |

OTHER PUBLICATIONS

Full Complex Transmission and Reflection Characterization of a Bragg Grating in a Single Laser Sweep, Mark Froggatt.

Optical Frequency Domain Characterization of Dispersion in Optical Fiber Bragg Gratings, Mark Froggatt et al., pp. 1–4.

A Coherent Optical Network Analyzer, A. Freundorfer, IEEE Transactions Photonics Technology Letters, vol. 3, No. 12, Dec. 1991, pp. 1139–1142.

Distributed Measurement of the Complex Modulation of a Photoinduced Bragg Grating in an Optical Fiber, Mark Froggatt et al., Applied Optics, vol. 35, No. 25, Sep. 1, 1996, pp. 5162–5164.

(List continued on next page.)

*Primary Examiner*—Samuel A. Turner
(74) *Attorney, Agent, or Firm*—Nixon & Vanderhye P.C.

(57) ABSTRACT

In order to characterize the optical characteristics of a device, a source of light having a variable frequency with a polarization state which varies linearly with frequency is provided as an input to the device under test. The input light is also passed through a known reference path and is added to the light output from the device under test in a beam combiner. The combined light for the frequencies of interest is split into two orthogonal polarizations which are then detected in a spectral acquisition apparatus and supplied to a microprocessor. The spectral measurements are digitized and curve-fitted to provide optical power versus optical frequency curves. Fourier transforms of each of the curves are calculated by the microprocessor. From the Fourier transforms, the four arrays of constants are calculated for the Jones matrix characterizing the device under test.

46 Claims, 8 Drawing Sheets

U.S. PATENT DOCUMENTS

| | | | |
|---|---|---|---|
| 4,907,885 A | 3/1990 | Globig | |
| 4,909,629 A | 3/1990 | Yokokura et al. | |
| 4,983,034 A | 1/1991 | Spillman, Jr. | |
| 5,003,626 A | 3/1991 | Kuwahara et al. | |
| 5,078,511 A | 1/1992 | Noll et al. | |
| 5,082,368 A | 1/1992 | Fuchs et al. | |
| 5,173,743 A | 12/1992 | Kim | |
| 5,202,745 A | 4/1993 | Sorin et al. | |
| 5,227,632 A * | 7/1993 | Armstrong et al. | 250/353 |
| 5,268,741 A | 12/1993 | Chou et al. | |
| 5,307,197 A | 4/1994 | Tanabe et al. | |
| 5,313,266 A | 5/1994 | Keolian et al. | |
| 5,323,258 A | 6/1994 | Tsushima et al. | |
| 5,457,563 A | 10/1995 | Van Deventer | |
| 5,459,599 A | 10/1995 | Van Deventer | |
| 5,469,455 A | 11/1995 | Reitz et al. | |
| 5,477,369 A | 12/1995 | Mahon et al. | |
| 5,588,013 A | 12/1996 | Reitz et al. | |
| 5,631,760 A | 5/1997 | Heidemann | |
| 5,663,793 A | 9/1997 | de Groot | |
| 5,694,216 A | 12/1997 | Riza | |
| 5,798,521 A | 8/1998 | Froggatt | |
| 5,844,235 A | 12/1998 | Tachikawa et al. | |
| 5,896,193 A | 4/1999 | Colbourne et al. | |
| 5,986,784 A | 11/1999 | Kersey et al. | |
| 6,008,487 A | 12/1999 | Tachikawa et al. | |
| 6,061,124 A | 5/2000 | Nyman et al. | |
| 6,111,676 A | 8/2000 | Lemus et al. | |
| 6,151,428 A | 11/2000 | Vahala et al. | |
| 6,160,826 A | 12/2000 | Swanson et al. | |
| 6,256,103 B1 | 7/2001 | Sorin et al. | |
| 6,259,529 B1 | 7/2001 | Sorin et al. | |
| 6,271,959 B1 | 8/2001 | Kim et al. | |
| 6,330,375 B1 | 11/2001 | Fishman et al. | |
| 6,359,685 B1 | 3/2002 | Colbourne et al. | |
| 6,376,830 B1 * | 4/2002 | Froggatt et al. | 250/227.14 |
| 6,385,358 B1 | 5/2002 | Everett et al. | |
| 6,426,496 B1 | 7/2002 | Froggatt et al. | |
| 6,486,958 B1 | 11/2002 | Szafraniec et al. | |
| 6,515,276 B2 | 2/2003 | Baney | |
| 6,535,289 B1 | 3/2003 | Baney et al. | |
| 6,538,787 B1 | 3/2003 | Moeller et al. | |
| 6,545,760 B1 | 4/2003 | Froggatt et al. | |
| 6,548,801 B1 | 4/2003 | Sorin et al. | |
| 6,552,782 B2 | 4/2003 | Colbourne et al. | |
| 6,566,648 B1 | 5/2003 | Froggatt | |
| 6,587,214 B1 | 7/2003 | Munks | |
| 6,606,158 B2 | 8/2003 | Rosenfeldt et al. | |
| 2002/0025103 A1 | 2/2002 | Thaniayvarn | |
| 2002/0067487 A1 | 6/2002 | Zhou et al. | |
| 2002/0113972 A1 | 8/2002 | Rosenfeldt et al. | |
| 2002/0130255 A1 | 9/2002 | Baney et al. | |
| 2002/0167670 A1 | 11/2002 | Baney | |
| 2002/0176645 A1 | 11/2002 | Wein et al. | |
| 2003/0011777 A1 | 1/2003 | Szafraniec et al. | |
| 2003/0016425 A1 | 1/2003 | Tan et al. | |
| 2003/0063285 A1 | 4/2003 | Pering | |

OTHER PUBLICATIONS

Distributed Measurement of Static Strain in an Optical Fiber with Multiple Bragg Gratings at Nominally Equal Wavelengths, Mark Froggatt et al., Applied Optics, Apr. 1, 1998, vol. 37, No. 10, pp. 1741–1746.

High–Spatial–Resolution Distributed Strain Measurement in Optical Fiber with Rayleigh Scatter, Mark Froggatt et al., Apr. 1, 1998, vol. 37, No. 10, Applied Optics, pp. 1735–1740.

Coherent Frequency–Domain Reflectometry for Characterization of Single–Mode Integrated–optical Waveguides, U. Glombitza et al, Journal of Lightwave Technology, vol. 11 No. 8, Aug. 1993, pp. 1377–1384.

Sensitive Collinear Laser Spectroscopy on Fast Atom and Ion Beams, H. K. Carter, pp. 60–64.

The Vibrational Predissociation Lifetime of the HF Dimer Upon Exciting the "free–H" Stretching Vibration, Huang et al., J. Chem. Phys. 85(6), Sep. 15, 1986, pp. 3338–3341.

Tunable Diode Laser Spectroscopy: an Invited Review, Eng. et al., Optical Engineering, Nov./Dec. 1980, vol. 19, No. 6, pp. 945–959.

Sub–Doppler Resolution Infrared Spectroscopy of the Acetylene Dimer: A Direct Measurement of the Predissociation Lifetime, Miller et al., J. Chem. Phys, vol. 80, No. 11, Jun. 1, 1984, pp. 5453–5457.

Computer Control of Broadly Tunable Lasers: Conversion of a Color Center Laser into a High Resolution Laser Spectrometer, Kasper et al., Applied Optics, vol. 21, No. 2, Jan. 15, 1982, pp. 236–247.

Far–Field Radiation Pattern of Tunable Diode Lasers, pp. 164–165.

Analytical Application of Lasers, Chemical Analysis vol. 87.

Spectral Smoothing, Applications of Numeral Methods in Molecular Spectroscopy.

Spectral Techniques, vol. II, 1981, Vanasse, pp. 181–238.

Diode Laser Spectra With Simultaneous Frequency Calibration, A. Chraplyvy, Applied Optics, vol. 17, No. 17, Sep. 1, 1978.

Single–Scan Current–Modulated Tunable Diode Laser Spectrometer of Improved Calibration and Throughput Perfomance, Trankle et al., Applied Optics, vol. 21, No. 22, Nov. 15, 1982, pp. 4151–4153.

Tunable Diode Laser Spectroscopy of $Co_2$ in the 10– to 15 $\mu$m Spectral Region–Lineshape and Q–Branch Head Absorption Profile, Eng et al., Journal of Molecular Spectroscopy 74, 1979, pp. 331–344.

Intermode Calibration of Diode–Laser Spectra Using Tandem Etalons, D. Jennings, Applied Optics, vol. 19, No. 1, Jan. 1, 1980, pp. 2–4.

Absorption Spectroscopy with Lasers, Chemical Analysis, vol. 50, Wiley.

Chemical Analysis, vol. 87, Analytical Applications of Lasers, Infrared Absorption Spectroscopy.

The Infrared Spectra of $^{12}C^{32}S$, $^{12}C^{34}S$, and $^{12}C^{33}S$, $^{13}C^{32}S$, Journal of Molecular Spectroscopy, Terry Todd et al., pp. 190–202, 1979.

Infrared diode laser Double–Beam Spectrometer, Applied Optics, Dubs et al., Nov. 15, 1978, vol. 17, No. 22, pp. 3593–3597.

Wavelength Calibration of Tunable Diode Lasers Using Etalons, Flicker et al., Applied Optics, Mar. 15, 1978, vol. 17, No. 6, pp. 851–852.

Tunable Diode Laser Spectroscopy in the Infrared: Some Practical Considerations of Techniques and Calibration with $V_2$ Lines of HCN, Reddy et al., Applied Optics, vol. 18, No. 9, May 1, 1979, pp. 1350–1354.

* cited by examiner

US 6,856,400 B1

APPARATUS AND METHOD FOR THE COMPLETE CHARACTERIZATION OF OPTICAL DEVICES INCLUDING LOSS, BIREFRINGENCE AND DISPERSION EFFECTS

This application claims priority from provisional application Ser. No. 60/255,077 filed Dec. 14, 2000 and now abandoned.

BACKGROUND OF THE INVENTION

1. Field of Application

The present invention generally relates to the measurement of the optical characteristics of optical waveguide devices and, in particular, relates to devices for characterizing the optical effect of various devices upon an optical system.

2. Discussion of Prior Art

Waveguide devices such as Bragg gratings, interleavers, couplers, isolators, etc. require accurate characterization if they are to be used in deployable optical fiber networks. Generally this characterization has been accomplished using a few simple specifications such as insertion loss, bandwidth, polarization dependent loss, etc. The devices actually have responses that are significantly more complicated that these specifications can describe. Although the simplification of the characterization is necessary to allow for the use of interchangeable parts, and rational specifications for manufacturers to meet, obtaining a full and complete measurement of the device from which any desired specification can be calculated would have benefits to both manufacturers and their customers.

First of all, full device characterization would permit computer system models that are much more accurate, and would inherently contain aspects of the device that have not been explicitly specified. Second, in cases where manufacturers use different specifications, or consumers require a new set of specifications, devices could be accurately compared, or new specifications developed from the complete measurement function stored in a database. For most devices this measurement function would consist of four complex functions that would occupy less than 200 kB of storage. Finally, if the complete characterization of the device can be achieved with a single instrument, then final testing of devices would be greatly simplified while remaining completely general.

It is worthwhile to describe some of the fundamental differences between the characteristics of fiber-optic links, and fiber-optic components (excluding fiber). Fiber-optic links are generally very long (>50 km), and have very broad spectral features that vary on the scale of tens of nanometers. Because of the great lengths involved and high launch powers used to over come the loss, nonlinear interactions of light in the fiber are of significant interests. These nonlinear properties are not easily reduced to a simple transfer function matrix. In very long fiber-optic links such a submarine links, optical amplifiers are used to regenerate the signal and overcome loss. These amplifiers often operate in saturation which is another non-linear effect not captured in a simple transfer function matrix. Generally, fiber-optic links are not well characterized by simple transfer functions.

The relatively short path lengths (<1 m) within fiber optic components prevents any significant non-linear behavior. Because many passive fiber-optic components are filters used to separate channels closely spaced in wavelength, they are designed to have rapid variations in their properties, as a function of wavelength. Optical filters often display variations on the scale of tens of picometers instead of tens of nanometers as seen in fiber optic links. Not only does the transmission amplitude of these functions vary rapidly, but the phase response does as well, and so, in high bit-rate applications, the phase response must be accurately measured as well. Also, due to the fabrication techniques, many filters display some variation as a function of polarization. Again, in high bit-rate systems, this variation must be accurately characterized. It is in these last two measurements, optical phase, and polarization dependence, that the inventions presented here excel.

The underlying technology used was initially developed by Glombitza and Brinkmeyer, and published in 1993 ("Coherent Frequency-Domain Reflectometry for Characterization of Single-Mode Integrated-Optical Waveguides," Journal of Lightwave Technology, Vol. 11, No. 8, August 1993). No patents were filed by either author with regard to this technology. Patents of a similar nature are U.S. Pat. No. 5,082,368 "Heterodyne optical time domain reflectometer," which employed an acousto-optic modulator, and U.S. Pat. No. 4,674,872 "Coherent reflectometer," which employed an optical phase shifter, and has expired due to nonpayment of maintenance fees. A co-pending U.S. patent application Ser. No. 09/606,120 filed Jun. 16, 2000 by Froggatt and Erdogan for an invention entitled "Single Laser Sweep Full S-Parameter Characterization of Fiber Bragg Gratings," herein incorporated by reference, expands upon the published and unpatented work by Glombitza and Brinkmeyer to describe how the measurement of the phase and amplitude of the time domain response of a system can be used to determine the frequency domain (spectral) response of the system as well via an inverse Fourier transform. U.S. Pat. No. 5,896,193 for "Apparatus for testing an optical component" also describes an interferometer much like that described by Glombitza and Brinkmeyer although the patent filing on February 14, 1997 post dates the Glombitza and Brinkmeyer article publication date of August 1993 by over three years.

The Jones Matrix Representation

An optical fiber component supporting two polarization modes can be fully described using a wavelength dependent Jones matrix. This matrix describes the transfer of energy from the device input to the device output, encompassing the full effects of polarization dependence. The Jones Matrix relates the input electric field to the output electric field by:

$$\begin{bmatrix} E_{s,out} \\ E_{p,out} \end{bmatrix} = \begin{bmatrix} a & b \\ c & d \end{bmatrix} \begin{bmatrix} E_{s,in} \\ E_{p,in} \end{bmatrix} \qquad \text{Eqn. 1}$$

where $E_S$ and $E_P$ are complex electric field amplitudes of the two orthogonal fields used to represent the total electric field. These orthogonal fields may be any orthogonal state and linear states oriented at 90 degrees are the most common. However, left hand and right hand 9 circular would be an equally valid choice. No particular pair of orthogonal states is needed for the present invention.

This four element two-by-two matrix is completely general and includes all aspects of the device behavior. If the four complex numbers (a, b, c & d) can be measured as a function of frequency, then the device has been completely characterized. It is therefore an object of this invention to measure these four quantities, and from this basic physical measurement derive any and all of the desired parameters describing the device.

SUMMARY OF THE INVENTION

It is an object of the present invention to supply a controlled light input to a fiber optic device and then compare the output from the device with the input to characterize the effect of the device on such light.

In the broadest sense, the present invention involves the supplying of light having an optical frequency content over the frequency range of interest where the light has a polarization state which varies linearly with the frequency. This light is provided to the device under test. The light is affected by the device and is output therefrom. The affected output light is combined in a combiner with the input light over the frequency range of interest. The combined light from the combiner is detected and digitized over a plurality of measurements in the frequency range. A microprocessor derives power curves from the digitized combiner output. The microprocessor calculates the Fourier transform of the respective curves and derives from the Fourier transforms four arrays of constants for the Jones matrix characterizing the device.

In a specific embodiment, a source of variable frequency light which could be a tunable frequency laser is provided where the light has a similar polarization. The light is supplied to a "spinner" which provides output light having a polarization which varies linearly with the changing frequency of the light. The light from the spinner is supplied as an input to the device under test and also to a beam combiner. The resultant light from the device under test is also supplied to the input of the combiner and its output is supplied to a polarization beam splitter. After having the combined light split into two orthogonal polarization states, the two orthogonally polarized beams of light are supplied to respective detectors. The outputs from the detectors is digitized over a plurality of measurements taken at differing frequencies and respective curves power are derived A programmed microprocessor calculates the Fourier transform for each of the curves and derives four arrays of constants for a Jones matrix characterizing the device under test.

BRIEF DESCRIPTION OF THE DRAWINGS

In order that the present invention may be more clearly understood, examples of various embodiments thereof may be described by reference to the following drawings, in which.

DETAILED DISCUSSION OF EMBODIMENTS

Figure 1:
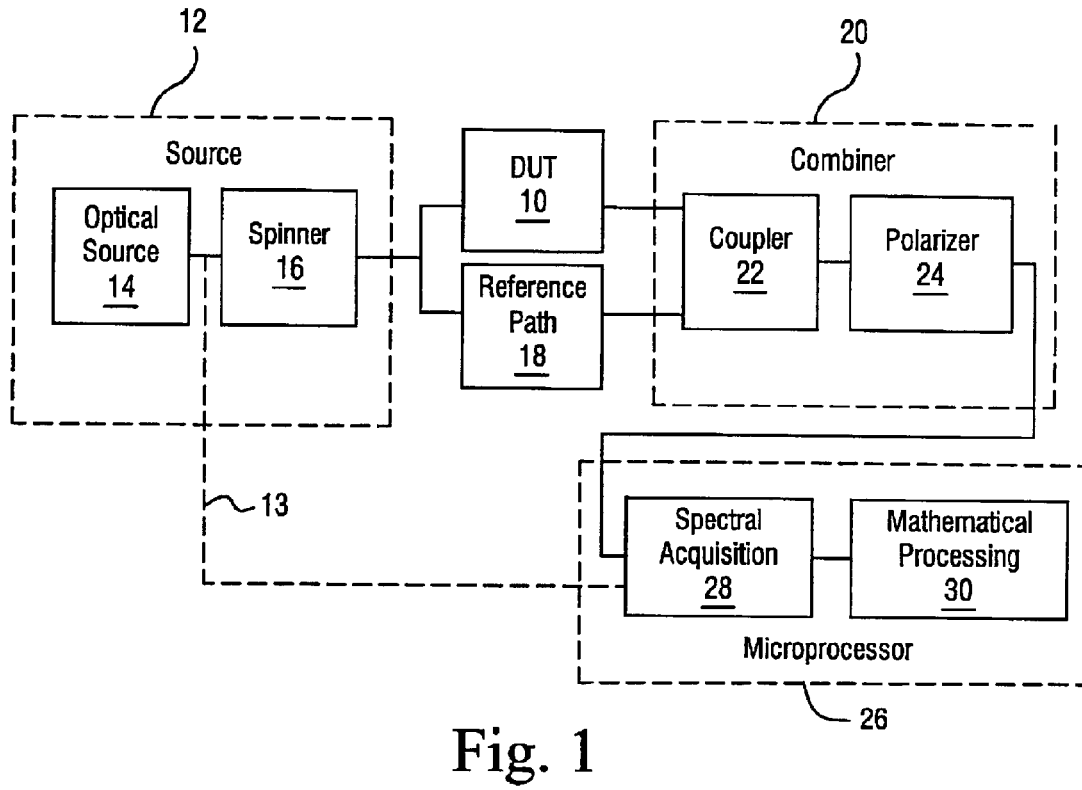
FIG. 1 is a block diagram showing a generic version of the present invention.

For simplicity of understanding, similar components will be similarly numbered throughout the several views.

The inventions described here can readily measure the matrix above, however, the basis vectors used to describe the electric field is left unknown. This topic, and the reason that it can be neglected is described in the section "Unitary Translation and Polarization Characteristics".

Unitary Translation and Polarization Characteristics

Telecommunications systems use optical fiber that supports two polarization modes. Some effort has been expended to develop single-polarization mode optical fiber, but the losses remained too high to permit their use in long-distance transmission systems, and so, two at, polarization modes are supported in all currently installed fiber-optic links, and will continue to be supported in all links installed in the foreseeable future.

A "supported" mode is one that will propagate over long distances. The two modes supported in telecom links can be described as "degenerate" meaning that light in each mode propagates down the fiber at nearly the same speed. The difference in the speed of propagation between the modes is referred to as polarization-mode-dispersion. For short lengths of optical fiber (<100 m), this difference in propagation velocity is so small that the delay difference is essentially zero. Over very long transmission distances (>50 lm), the very small difference in propagation speed can cause significant differences in the delay between polarization modes. This accumulated difference now forms the barrier to increased data rates in optical fiber. As a result, methods to compensate for polarization mode dispersion are now at the center of many optical fiber communications research programs.

When the polarization-mode-dispersion in an optical fiber is kept small, the two modes are considered to be degenerate. A consequence of degeneracy is that energy can very easily move between the supported modes in the fiber. This freedom of movement between the supported modes in the optical fiber means that the polarization state in optical fiber is essentially uncontrolled. Mild bends, external stresses, and thermal changes can all change the state of polarization of light in optical fiber.

Although the input and output polarization states for a segment of fiber can be considered to be independent, the lossless nature of fiber transmission does impose some restrictions on the output state of the light. First of all, the amplitude of the output light must be the same as the input light (which is essentially the definition of lossless). Less obvious, but of great importance is the maintenance of orthogonality, i.e., when the dot product of two fields is zero.

Orthogonal polarization states do not interfere with one another, and by combining the states in different phases and amplitudes, we can represent all states of polarization. Pairs of orthogonal states, therefore, represent an important physical construct. In a lossless system, such as an optical fiber, orthogonal inputs result in orthogonal outputs. Any section of optical fiber can then be modeled as a "unitary translation."

What does the concept of unitary translation mean to optical fiber systems? A good analogy is that of a three dimensional object in space that is rotated. Take for instance, a cat. If I have a cat and rotate it by some amount left to right, and then another amount front to back, potentially every point on the cat changes location, however, all of the important properties about the cat remain the same. Equivalently, if an arbitrary section of optical fiber is placed between an instrument and a device, the measurement of the device is rotated by two unknown angles, but the properties of the device are all measured correctly. And because polarization states are not controlled in fiber-optic communications systems, the end user of the device cannot be certain of the device's "orientation" (with respect to the incident polarization) in the system, and must be assured that the device will work for all orientations. The concept of unitary translation can be extended further to measurement error. Any measurement error that can be represented as a multiplication by unitary matrices then becomes irrelevant to the measurement. The ability to fold such measurement errors, or unknowns, into the unknown fiber lead is what allows the present invention to be constructed in a tractable and economical way.

FIG. 1 is a block diagram of a generic version of an optical vector analyzer in accordance with the present invention. The device under test (DUT) 10 is supplied with light from source 12 (indicated by the dotted line box) where the light has an optical frequency content over the frequency range of interest (for the particular DUT) and the light has a polarization state which varies linearly with the frequency. In one preferred embodiment, the light supplied by the source 12 is provided by an optical source 14 (either a narrow linewidth source such as a tunable laser tunable over the bandwidth of interest or a broadband source of light including the bandwidth of interest) which supplies light to the device entitled "spinner" 16 (discussed in detail below), which provides the light with a polarization state which varies linearly with the frequency. In one embodiment the source 14 is a narrow linewidth tunable source such as a tunable laser, or a broadband source such as an LED or incandescent filament light. Although optical fiber is shown in the various drawings, it is understood that it could be replaced by a free-space collimated beam. Additionally, while couplers (indicated by ellipses) are used, the could be replaced by bulk-optic beam splitters.

The spinner 16 causes the state of polarization of the light to rotate through a great circle around the Poincané sphere as function of wavelength. The relationship between the angular change of the polarization state thought the great circle and the frequency of the light must be linear. The period of the variation (i.e. the frequency change needed for 2 pi rotation) must be greater than the spectral resolution of the acquisition system. In the case of a tunable laser source, this is the instantaneous linewidth of the source, and, in the case of an OSA (Optical Spectrum Analyzer, a widely used commercially available device), this is the resolution bandwidth of the OSA.

The output from source 12 is provided to a reference path 18 and to the input of the DUT 10. The reference path is a method of transmitting some portion of the light from the source 12 to the beam combiner 20. This path must have a Jones Matrix with a determinant that is not close to zero. In other words, this path cannot be a polarizer, and, is preferably a lossless optical transmission such as a fiber, but it need not be perfectly or substantially lossless. The matrix of the reference path must be invertible in a practical sense. The transmission path to the DUT need only satisfy the same criteria as the reference path matrix. The transmission path from the DUT should be substantially lossless, or lossless to the degree of the accuracy required by the measurement.

The output of the DUT 10 along with the output of the reference path 18 is supplied to the input of a beam combiner 20 (indicated by dotted line box). The combiner adds the light output from the DUT 10 and the reference path 18 for a plurality of frequencies in the frequency range of interest and splits the sum into two orthogonal polarizations. In preferred embodiments, the beam combiner 20 can be a coupling structure 22, such as a bulk-optic beam splitter or a fused tapered coupler, which supplies a combined light signal to a polarizer 24 which breaks the field into two orthogonal polarization states.

The two orthogonal polarizations from beam combiner 20 are supplied to the microprocessor 26 (indicated by dotted line box). In a preferred embodiment, the microprocessor 26 includes a spectral acquisition device 28 and a mathematical processor 30. The function of the spectral acquisition device 28 is to measure the power as a function of wavelength of the two signals from the polarizer. These signals may be acquired sequentially or in parallel depending upon the application and embodiment. The spectral acquisition device 28, if the optical source is a narrow linewidth tunable source such as a laser, will be a pair of detectors from which the power is sampled as a function of the frequency of the tunable source. Also, if the source is a narrow linewidth tunable source, then it may be necessary to send a small part of the light from the source to the spectral acquisition unit so that the wavelength may be accurately measured (as shown by the dotted line 13 connecting source 12 and microprocessor 26 in FIG. 1). If the source is a broadband optical source, then the spectral acquisition device 28 will need to be a spectral measurement system such as an OSA. If the spectral measurement is made by an OSA, then it will not be necessary to send a portion of the light from the source to the OSA.

The mathematical processing unit 30 includes a digitizer to convert the spectral measurements made in device 26 to digital form if necessary and is programmed to derive curves fitting the spectral outputs, where the curves are optical power versus optical frequency curves. Fourier transforms of each of the curves are calculated by the processor. From the Fourier transforms, four arrays of constants for a Jones matrix characterizing the DUT are calculated. Knowing the four arrays of constants of a Jones Matrix for the DUT allows total knowledge of how and in what fashion any device under test will affect an input signal and thus affect a fiber optic system.

Figure 2:
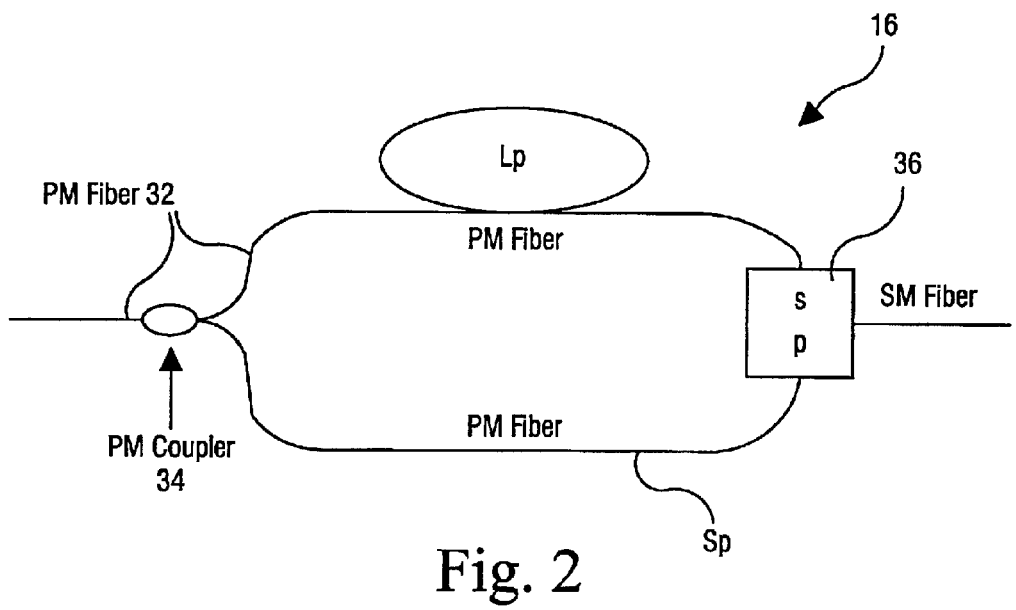
FIG. 2 is a schematic view of a spinner according to one embodiment of the present invention.

Details of the "spinner" 16 are shown in FIG. 2 and comprises an fiber-optic network constructed from Polarization Maintaining (PM) fiber 32, a splitter such as a PM coupler 34, a polarization beam combiner 36. In this embodiment the optical source 14 is a tunable laser which is desirable because the power vs. wavelength will be initially measured in 10 to 50 femtometer steps. The light from the laser is coupled to the polarization maintaining fiber 32 such that all of the light is in a single polarization mode. The light is then evenly split, using the polarization maintaining (PM) coupler 34. Half of the light travels through a long path Lp, and half of the light travels through a short path Sp. Light from the two paths is then recombined using the polarization spinner 36.

Figure 3:
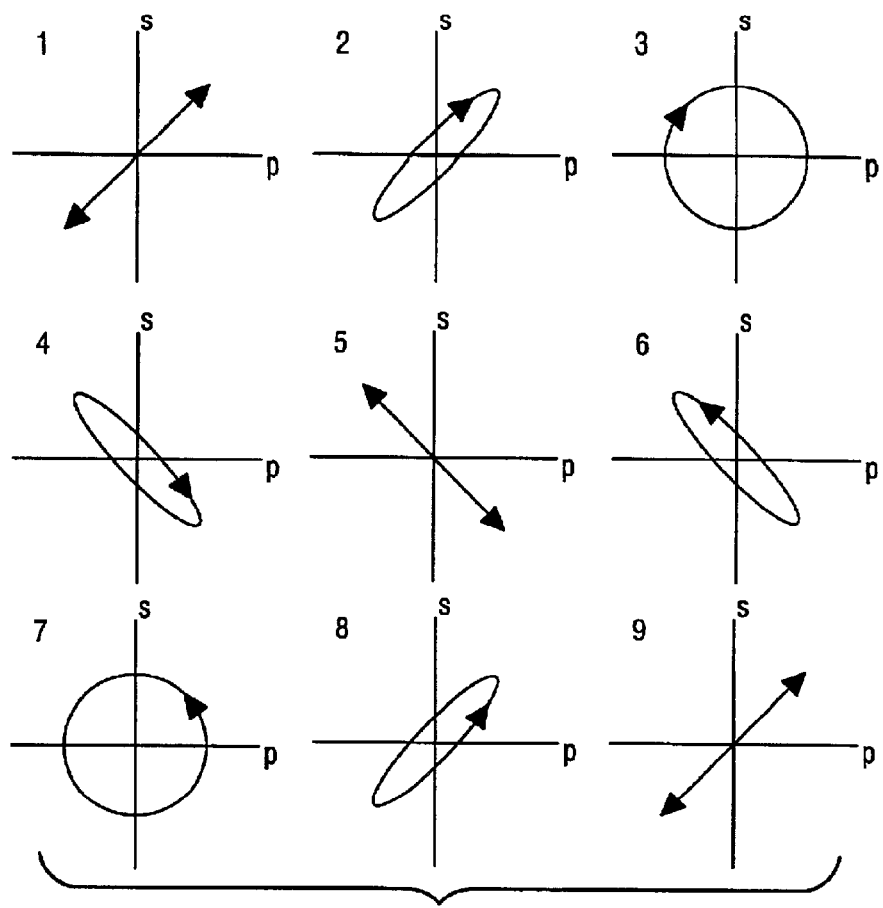
FIG. 3 is an illustration of a series of graphs of polarization versus frequency for the light exiting the polarization beam combiner.

The spinner 16 puts the light from one path into the x-polarization, and light from the other path into the orthogonal y-polarization. Because the path lengths of the two components are unequal, the relative phase between the x-polarized light and the y-polarized light is strongly wavelength dependent As a result the polarization state of the light exiting the polarization beam combiner 36 varies from linear to elliptical to right hand circular to elliptical, etc. as shown in the 9 graphs of FIG. 3. Graph 1 illustrates the evolution of the polarization state of the light exiting the polarization beam combiner 36. The curves show the path that the electric field of the light traverses at optical frequencies. Note that the states include both circular polarization states, and two orthogonal linear states.

Figure 4:
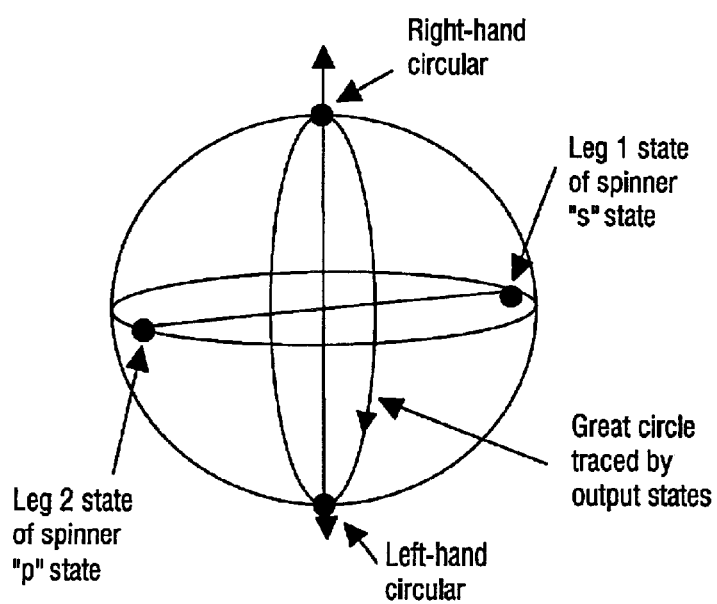
FIG. 4 is a representational view of the polarization states viewed on a Poincaré sphere.

If the polarization state is viewed on the Poincaré sphere as shown in FIG. 4, it will trace a great circle through the poles of the sphere. As the light passes through the fiber following the beam splitter, the polarization states will be changed. The changes in polarization caused by the single-mode fiber will be lossless, and as a consequence, the states will always trace a great circle. As shown in FIG. 4, the Poincaré sphere representation of the states through which the light exiting the polarization-beam-combiner traverses as the laser is tuned. The great circle traversed by the light has poles that are defined by the states of polarization of the light in each of the "spinner" arms. The resultant light output on the single mode (SM) fiber from combiner 36 of the spinner 16 has a polarization state which varies linearly with the frequency of the light input to the spinner.

Figure 5:
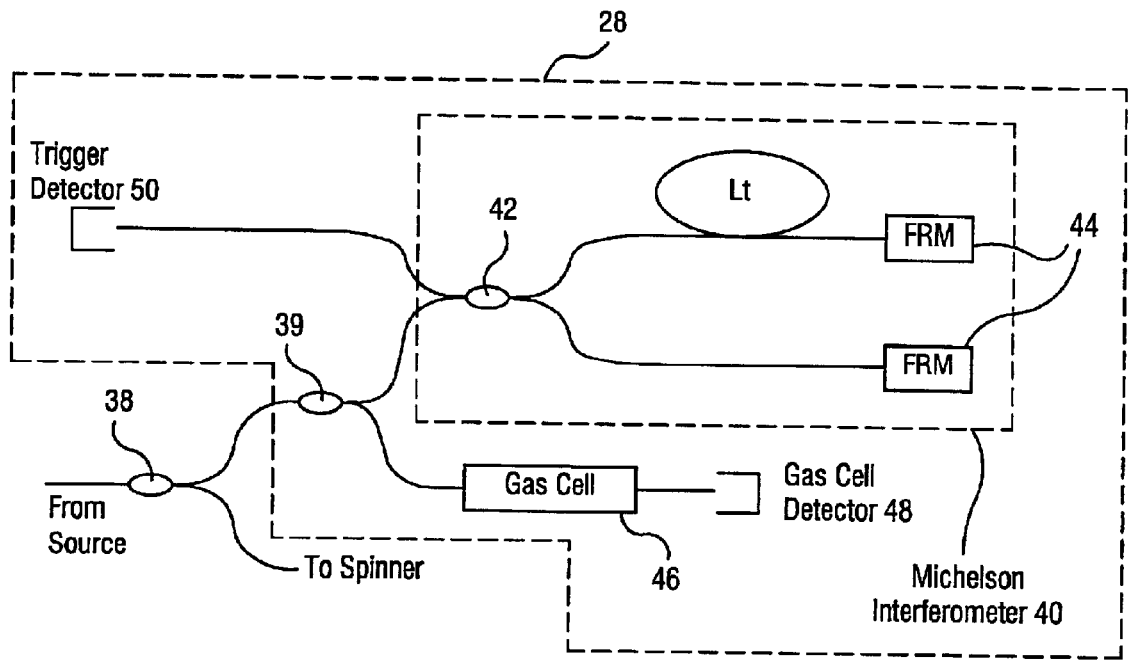
FIG. 5 is a schematic representation of a fiber-optic tunable laser monitoring network.

In order to monitor the source of light, in a preferred embodiment some of the light exiting the polarization beam combiner 36 of the spinner 16 is picked off by the single-mode coupler 38 as shown in FIG. 5. This picked off light is again split by a second single-mode coupler 39 (for example a 90/10 couple) and provides two light samples. One light sample (90% of the original beam) is used to trigger the acquisition of power at the final signal detectors in the spectral acquisition block 28 with the trigger detector 50. The trigger signal is generated by passing the light through a long Michelson interferometer 40 comprised of coupler 42, the trigger length of fiber Lt, and the two Faraday Rotator Mirrors (FRM's) 44. FRM's 44 are used in the interferometer to prevent polarization fading. In addition, the other light sample (10% of the original beam) is passed through a reference gas cell 46 and gas cell detector 48 to calibrate the laser wavelength to a National Institutes of Standards and Technology (NIST) traceable standard every sweep.

FIG. 5 illustrates the elements making up the spectral acquisition block 28 as shown by the dotted line. In FIG. 1, where the light sample is provided to the spectral acquisition block 28 along the dotted line 13, such line is shown in FIG. 5 as the line connecting HA, couplers 38 & 39. In FIG. 5, the Michelson interferometer 40 is connected to the trigger detector 50 which produces sampling signals at very precise frequency intervals. The FRM's 44 prevent fringe fading for fiber positions. The Gas Cell 46 serves as a NIST traceable standard for both the frequency increment of the Michelson interferometer trigger, and the absolute wavelength of the measurement. As shown, the light that is not picked off is split by a 50/50 coupler 41 (also known as a 3 dB coupler) and passed both through the DUT 10, and the reference path 18.

Figure 6:
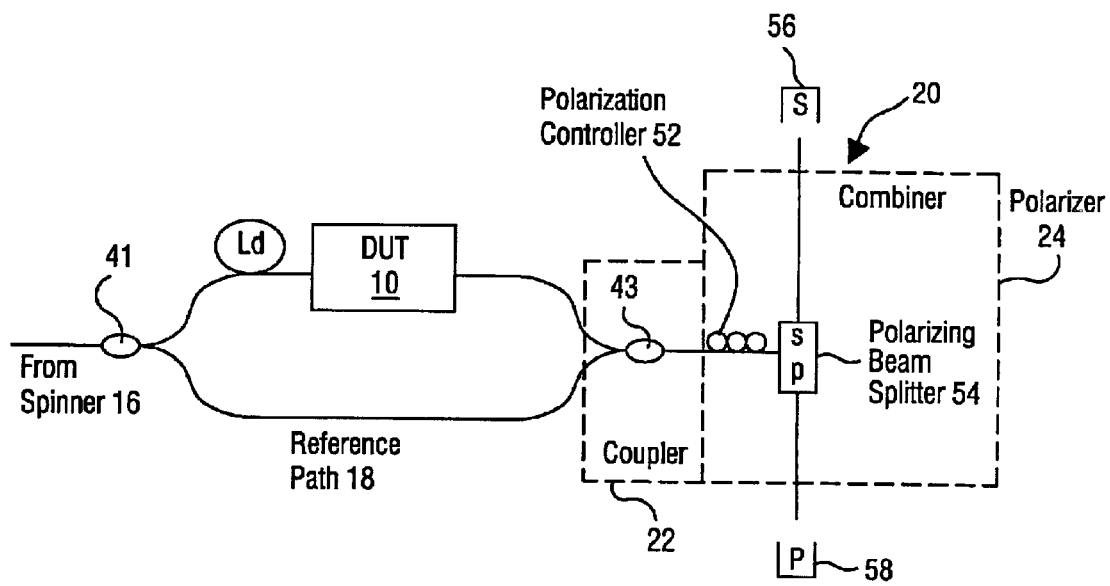
FIG. 6 is a schematic of the fiber-optic network used to create the interference fringes needed to determine the Jones Matrix for the Device Under Test (DUT)

FIG. 6 is a specific form of the generic invention shown in FIG. 1. The light from the two paths is then recombined in the coupler 22 in a preferred embodiment using a single-mode coupler 43. The recombined light is then passed to the polarizer 24 which includes an all-fiber polarization controller 52. This controller 52 forms an arbitrary lossless matrix that transforms one polarization state to another, without loss. The polarization controller could be located at any position between the spinner and the beam splitter 54 (except for along the DUT path). This transformation constitutes a "mapping" function. Adjusting the controller changes this matrix, but maintains its lossless nature. Mapping transforms the great-circle circumscribed on the Poincaré-sphere by the incident light to any other great circle. After passing through the polarization controller 52, the recombined light is then incident on a polarization-beam-splitter 54. At the beam splitter 54, the light is split into its x- and y- polarization components. These components are then incident on the s and p detectors 56 and 58, corresponding to the x and y components, respectively.

While the detectors 56 & 58 are shown outside of the dotted line encompassing the polarizer 24, they could be included within the polarizer and their output signal provided to the spectral acquisition block 28 as shown in FIG. 5. Alternatively, they could be included in the spectral acquisition block 28. The location is not important-just the fact that the output of the detectors 56 & 58, along with the outputs of the trigger detector 50 and the gas cell detector 48, are provided to the microprocessor 26.

The polarization controller 52 can be adjusted to one of two possible alignments. The adjustment should be made with no light coming through the measurement path. In one polarization controller alignment-referred to as the "nulled alignment"-the two linear polarization states are mapped to the two linear polarization states of the polarization-beam-splitter 54 when they pass through the reference path. In this alignment, the relative phase of the two states of polarization at the polarization-beam-coupler 43 does not affect the power splitting ratio at the polarization-beam-splitter 54 for reference path light, and as a result, no fringes are observed when the laser is tuned.

In the other polarization controller alignment-referred to as the "maximum contrast alignment"-the great circle circumscribed by the reference light is made to intersect with the two linear polarization states of the beam splitter 54. Whenever the reference polarization state passes through one of the linear states of the beam splitter, all of the reference power is incident on one detector, and none is incident on the other detector. The reference power then oscillates between the s and p detectors 56 & 58, respectively, going to zero on one detector when the power is maximized on the other detector. This output in a preferred embodiment is provided to the spectral acquisition unit 28.

If we look at the Fourier transform of the fringes, we get a time domain response, with the time domain response of each Jones matrix element arriving at a different time. By properly selecting the complex valued points associated with each matrix element, we can then use an inverse Fourier transform to compute the frequency domain (spectral) Jones matrix elements. While each term is multiplied by a phase error, the result of this phase error is equivalent to an arbitrary section of lossless optical fiber added to the device, and thus has no effect on the measured properties of the device.

Figure 7A:
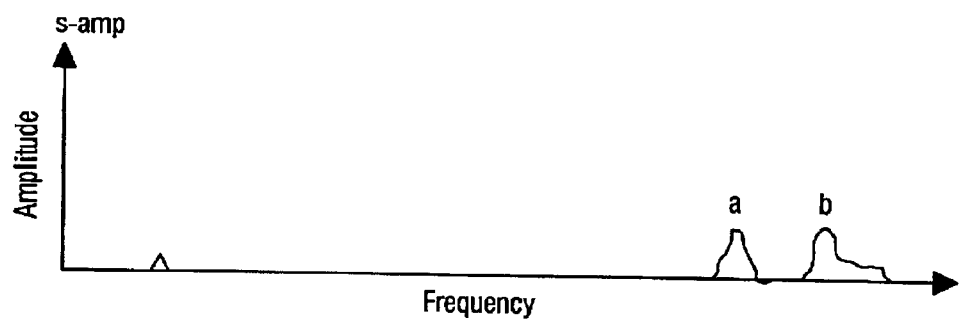
FIGS. 7A and 7B are comparison of graphs of detected signal amplitude versus frequency for the s and p detectors for a "nulled" alignment.
Figure 7B:
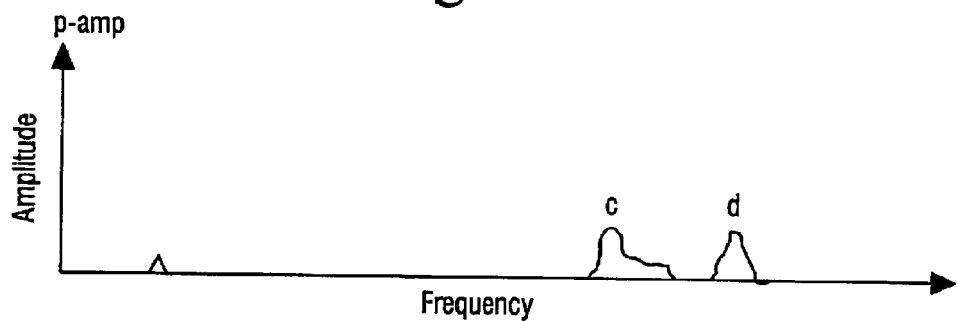
Figure 8A:
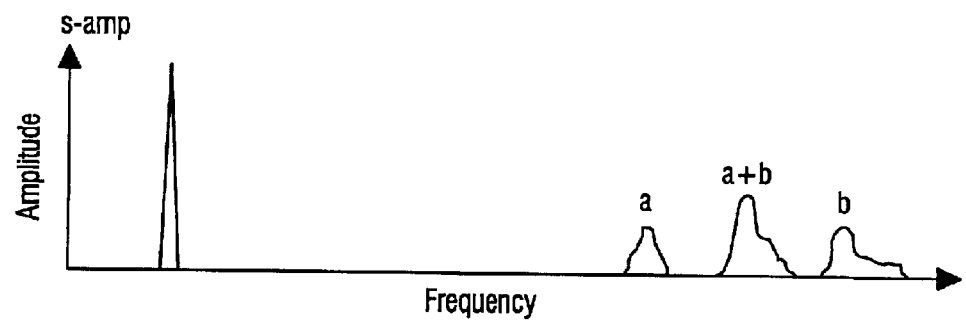
FIGS. 8A and 8B are comparison of graphs of detected signal amplitude versus frequency for the s and p detectors for a "maximized" alignment.
Figure 8B:
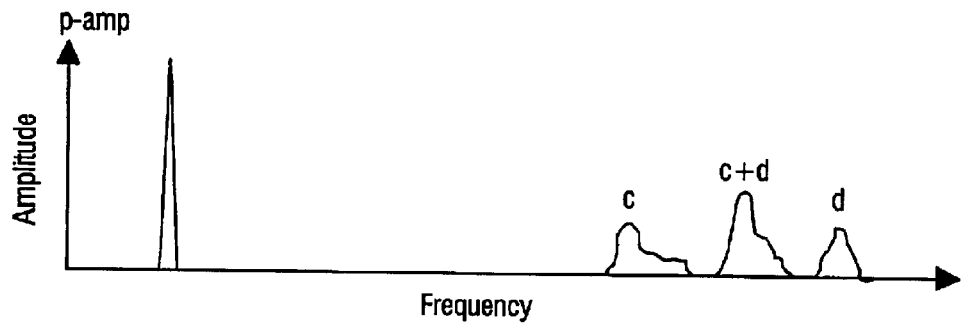

FIGS. 7A and 7B are illustrations of the amplitude versus frequency of the Fourier Transform of the interference fringes measured by the network in FIG. 6 for the "nulled" alignment. FIGS. 8A and 8B are illustrations of the amplitude of the Fourier Transform of the interference fringes measured by the network in FIG. 6 for the "maximized" alignment.

Theoretical Analysis

We can begin by representing the DUT or "device" as a simple diagonal 2×2 matrix with complex, frequency-dependent entries, $$\overline{\overline{M_D}} = \begin{bmatrix} m_1(\omega) & 0 \\ 0 & m_2(\omega) \end{bmatrix} \qquad \text{Eqn. 2}$$

In order to measure the complete response of the DUT, it is necessary that two orthogonal polarizations be incident upon the device. These states cannot be incident simultaneously, because the linear superposition of these states will form a new, single polarization. In order to perform a rapid measurement that will completely characterize the device, it is desirable to use a polarization state that changes rapidly with frequency, such that the device response does not appreciably change for one complete cycle through polarization states. An optical device to produce this rapidly varying polarization using a PM splitter and a polarization spinner 36, has previously been disclosed in FIG. 2 as a "spinner" and would cost on the order of about $3000.

In the "spinner" of FIG. 2, the fiber-optic network produces a polarization state that is strongly dependent on wavelength. The use of Polarization Maintaining (PM) fiber and a polarization beam coupler 43 guarantees orthogonality of the recombined states, and results in a well-defined set of states through which the polarization evolves as the frequency of the light is changed.

The normalized field emerging from this device is then given by, $$E_0 = \frac{1}{\sqrt{2}} \begin{bmatrix} 1 \\ e^{-i\omega\tau_p} \end{bmatrix} \qquad \text{Eqn. 3}$$

In order to meet the criteria above that the polarization state vary rapidly enough that the response of the DUT does not change appreciably through a single cycle, the delay, $\tau_p$, in the network above must be greater than the impulse response length of the device, $\tau_h$. The fiber network that transfers this field from the 50/50 beam splitter 41 to the DUT will have largely uncontrollable polarization properties. It is desirable to impose two restrictions on this network. First, it have no Polarization Dependent Loss (PDL), and second, the matrix describing the network be constant as a function of frequency over the range of frequencies that is of interest. Of these two requirements, the zero PDL criteria is the most difficult to satisfy. The matrix for such a network is, $$\overline{\overline{M_T}} = \begin{bmatrix} e^{i\phi}\cos\theta & -e^{i\psi}\sin\theta \\ e^{i\psi}\sin\theta & e^{-i\phi}\cos\theta \end{bmatrix} e^{-i\omega\tau_T} \qquad \text{Eqn. 4}$$

There will be an arbitrary lossless matrix between the polarization spinner 36, and the device, and then a second arbitrary lossless matrix between the device and the polarizing beam splitter 54, and so the total response matrix is given by, $$\overline{\overline{M_R}} = \overline{\overline{M_{T2}}} \cdot \overline{\overline{M_D}} \cdot \overline{\overline{M_{T1}}} \qquad \text{Eqn. 5}$$

which yields a new matrix in which each entry may be nonzero, $$\overline{\overline{M_R}} = \begin{bmatrix} a & b \\ c & d \end{bmatrix} \qquad \text{Eqn. 6}$$

Figure 9:
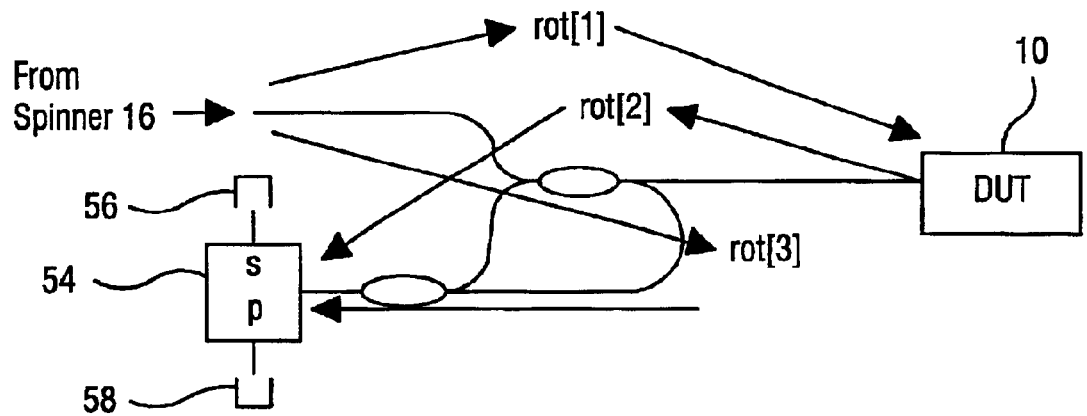
FIG. 9 is a schematic showing the optical path and associated lossless translation matrices.

FIG. 9 is an illustration of the optical path and some associated lossless translation matrices (rot [1], rot [2], and rot [3]). The electric field also undergoes a translation through a lossless matrix from the spinner 16 to the polarizing beam splitter 54. This reference field is then given by, $$\overline{E}_{ref} = \begin{bmatrix} e^{i\phi}\cos\theta & -e^{-i\psi}\sin\theta \\ e^{i\psi}\sin\theta & e^{i\phi}\cos\theta \end{bmatrix} \begin{bmatrix} 1 \\ e^{i\omega\tau_p} \end{bmatrix} \frac{e^{-i\omega\tau_{ref}}}{2} \qquad \text{Eqn. 7}$$

The measured field is given by, $$\overline{E}_{meas} = \begin{bmatrix} a & b \\ c & d \end{bmatrix} \begin{bmatrix} 1 \\ e^{-i\omega\tau_p} \end{bmatrix} \frac{e^{-i\omega\tau_D}}{4} \qquad \text{Eqn. 8}$$

and the field at the beam splitter 54 is given by $$\overline{E}_{split} = \begin{bmatrix} e^{i\phi}\cos\theta & -e^{-i\psi}\sin\theta \\ e^{i\psi}\sin\theta & e^{-i\phi}\cos\theta \end{bmatrix} \begin{bmatrix} 1 \\ e^{-i\omega\tau_p} \end{bmatrix} \qquad \text{Eqn. 9}$$

$$\frac{e^{-i\omega\tau_{ref}}}{2} + \begin{bmatrix} a & b \\ c & d \end{bmatrix} \begin{bmatrix} 1 \\ e^{i\omega\tau_p} \end{bmatrix} \frac{e^{-i\omega\tau_D}}{4}$$

Multiplying the vector and matrix in the first term gives, $$\overline{E}_{split} = \begin{bmatrix} e^{i\phi}\cos\theta - e^{-i(\psi+\omega\tau_p)}\sin\theta \\ e^{i\psi}\sin\theta + e^{-i(\phi+\omega\tau_p)}\cos\theta \end{bmatrix} \frac{e^{-i\omega\tau_{ref}}}{2} + \qquad \text{Eqn. 10}$$

$$\begin{bmatrix} a & b \\ c & d \end{bmatrix} \begin{bmatrix} 1 \\ e^{-i\omega\tau_p} \end{bmatrix} \frac{e^{-i\omega\tau_D}}{4}$$

and the multiplying the vector and matrix in the second term gives, $$\overline{E}_{split} = \begin{bmatrix} e^{i\phi}\cos\theta - e^{-i(\psi+\omega\tau_p)}\sin\theta \\ e^{i\psi}\sin\theta - e^{-i(\phi+\omega\tau_p)}\cos\theta \end{bmatrix} \frac{e^{-i\omega\tau_{ref}}}{2} + \qquad \text{Eqn. 11}$$

$$\begin{bmatrix} a + be^{-i\omega\tau_p} \\ c + de^{-i\omega\tau_p} \end{bmatrix} \frac{e^{-i\omega\tau_D}}{4}$$

The fields are then split at the beam splitter 54, and sent to separate detectors 56, 58 for power measurement; these fields are given by, $$E_s = (e^{i\phi}\cos\theta - e^{-i(\psi+\omega\tau_p)}\sin\theta)\frac{e^{-i\omega\tau_{ref}}}{2} + (a + be^{-i\omega\tau_p})\frac{e^{-i\omega\tau_D}}{4} \quad \text{Eqn. 12}$$

and $$E_p = (e^{i\psi}\sin\theta + e^{-i(\phi+\omega\tau_p)}\cos\theta)\frac{e^{-i\omega\tau_{ref}}}{2} + (c + de^{-i\omega\tau_p})\frac{e^{-i\omega\tau_D}}{4} \quad \text{Eqn. 13}$$

A signal proportional to the power incident on the s-detector 56 is given by multiplying the field by its complex conjugate, $$E_s \cdot E_s^* = \left[(e^{i\phi}\cos\theta - e^{-i(\psi+\omega\tau_p)}\sin\theta)\frac{e^{-i\omega\tau_{ref}}}{2} + (a + be^{-i\omega\tau_p})\frac{e^{-i\omega\tau_D}}{4}\right] \cdot \left[(e^{-i\phi}\cos\theta - e^{i(\psi+\omega\tau_p)}\sin\theta)\frac{e^{i\omega\tau_{ref}}}{2} + (a^* + b^*e^{i\omega\tau_p})\frac{e^{i\omega\tau_D}}{4}\right] \quad \text{Eqn. 14}$$

Expanding this gives, $$E_s \cdot E_s^* = \frac{1}{4}(1 - e^{i(\psi+\phi+\omega\tau_p)}\cos\theta\sin\theta - e^{-i(\psi+\phi+\omega\tau_p)}\cos\theta\sin\theta) + \frac{1}{16}(|a|^2 + |b|^2 + ab^*e^{i\omega\tau_p} + a^*be^{-i\omega\tau_p}) + \frac{1}{8}(e^{i\phi}\cos\theta - e^{-i(\psi+\omega\tau_p)}\sin\theta)(a^* + b^*e^{i\omega\tau_p})e^{i\omega(\tau_D-\tau_{ref})} + \frac{1}{8}(e^{-i\phi}\cos\theta - e^{i(\psi+\omega\tau_p)}\sin\theta)(a + be^{-i\omega\tau_p})e^{-i\omega(\tau_D-\tau_{ref})} \quad \text{Eqn. 15}$$

Reducing the expression to only its real parts, $$E_s \cdot E_s^* = \frac{1}{4}[1 - \sin(2\theta)\cos(\psi+\phi+\omega\tau_p)] + \frac{1}{16}(|a|^2 + |b|^2 + 2\text{Re}[ab^*e^{i\omega\tau_p}]) + \frac{1}{8}\text{Re}\left[(e^{i\phi}\cos\theta - e^{-i(\psi+\omega\tau_p)}\sin\theta)(a^* + b^*e^{i\omega\tau_p})e^{i\omega(\tau_D-\tau_{ref})}\right] \quad \text{Eqn. 16}$$

And then expanding the third term, $$E_s \cdot E_s^* = \frac{1}{4}[1 - \sin(2\theta)\cos(\psi+\phi+\omega\tau_p)] + \frac{1}{16}(|a|^2 + |b|^2 + 2\text{Re}[ab^*e^{i\omega\tau_p}]) + \frac{1}{8}\text{Re}\left[(a^*e^{i\phi}\cos\theta + b^*e^{i\omega\tau_p}e^{i\phi}\cos\theta - e^{-i(\psi+\omega\tau_p)}\sin\theta a^* - e^{-i(\psi+\omega\tau_p)}\sin\theta b^*e^{i\omega\tau_p})e^{i\omega(\tau_D-\tau_{ref})}\right] \quad \text{Eqn. 17}$$

And a little bit or reordering $$E_s \cdot E_s^* = \frac{1}{4}[1 - \sin(2\theta)\cos(\psi+\phi+\omega\tau_p)] + \frac{1}{16}(|a|^2 + |b|^2 + 2\text{Re}[ab^*e^{i\omega\tau_p}]) + \quad \text{Eqn. 18}$$

$$\frac{1}{4}\text{Re}\left[(a^*e^{i\phi}\cos\theta - b^*e^{-i\psi}\sin\theta + b^*e^{i(\phi+\omega\tau_p)}\cos\theta - a^*e^{-i(\psi+\omega\tau_p)}\sin\theta)e^{i\omega(\tau_D-\tau_{ref})}\right]$$

Now, repeat for the p-polarization $$E_p \cdot E_p^* = \quad \text{Eqn. 19}$$

$$\left[(e^{i\psi}\sin\theta + e^{-i(\phi+\omega\tau_p)}\cos\theta)\frac{e^{-i\omega\tau_{ref}}}{2} + (c + de^{-i\omega\tau_p})\frac{e^{-i\omega\tau_D}}{4}\right] \cdot \left[(e^{-i\psi}\sin\theta + e^{i(\phi+\omega\tau_p)}\cos\theta)\frac{e^{i\omega\tau_{ref}}}{2} + (c^* + d^*e^{i\omega\tau_p})\frac{e^{i\omega\tau_D}}{4}\right]$$

expanding and collecting real parts, $$E_p \cdot E_p^* = \frac{1}{4}[1 + \sin(2\theta)\cos(\phi+\psi+\omega\tau_p)] + \frac{1}{16}[|c|^2 + |d|^2 + 2\text{Re}[cd^*e^{i\omega\tau_p}]] + 2\text{Re}\left[\frac{1}{8}[(e^{i\psi}\sin\theta + e^{-i(\phi+\omega\tau_p)}\cos\theta)(c^* + d^*e^{i\omega\tau_p})e^{i\omega(\tau_D-\tau_{ref})}]\right] \quad \text{Eqn. 20}$$

expanding the third term again $$E_p \cdot E_p^* =$$

$$\frac{1}{4}[1 + \sin(2\theta)\cos(\phi+\psi+\omega\tau_p)] + \frac{1}{16}[|c|^2 + |d|^2 + 2\text{Re}[cd^*e^{i\omega\tau_p}]] + \frac{1}{4}\text{Re}\left[(c^*e^{i\psi}\sin\theta + d^*e^{i\omega\tau_p}e^{-i(\phi+\omega\tau_p)}\cos\theta + d^*e^{i\omega\tau_p}e^{i\psi}\sin\theta + c^*e^{-i(\phi+\omega\tau_p)}\cos\theta)e^{i\omega(\tau_D-\tau_{ref})}\right]$$

and a final reordering $$E_p \cdot E_p^* = \frac{1}{4}[1 + \sin(2\theta)\cos(\phi+\psi+\omega\tau_p)] + \quad \text{Eqn. 22}$$

$$\frac{1}{16}[|c|^2 + |d|^2 + 2Re[cd^*e^{i\omega\tau_p}]] + \frac{1}{4}\text{Re}\left[(c^*e^{i\psi}\sin\theta + d^*e^{-i\phi}\cos\theta + d^*e^{i(\psi+\omega\tau_p)}\sin\theta + c^*e^{-i(\phi+\omega\tau_p)}\cos\theta)e^{i\omega(\tau_D-\tau_{ref})}\right]$$

So, our detected powers for the p and s detectors 58 & 56, respectively are, $$E_s \cdot E_s^* = \frac{1}{4}[1 - \sin(2\theta)\cos(\psi+\phi+\omega\tau_p)] + \quad \text{Eqn. 23}$$

$$\frac{1}{16}(|a|^2 + |b|^2 + 2Re[ab^*e^{i\omega\tau_p}]) + \frac{1}{4}\text{Re}\left[(ae^{-i\phi}\cos\theta - be^{i\psi}\sin\theta + be^{-i(\phi+\omega\tau_p)}\cos\theta - ae^{i(\psi+\omega\tau_p)}\sin\theta)e^{-i\omega(\tau_D-\tau_{ref})}\right]$$

and $$E_p \cdot E_p^* = \frac{1}{4}[1 + \sin(2\theta)\cos(\phi + \psi + \omega\tau_p)] + \qquad \text{Eqn. 24}$$

$$\frac{1}{16}[|c|^2 + |d|^2 + 2Re[cd^*e^{i\omega\tau_p}]] +$$

$$\frac{1}{4}Re[(ce^{-i\psi}\sin\theta - de^{i\psi}\cos\theta + de^{-i(\psi+\omega\tau_p)}\sin\theta +$$

$$ce^{i(\phi+\omega\tau_p)}\cos\theta)e^{-i\omega(\tau_D-\tau_{ref})}]$$

Figure 10:
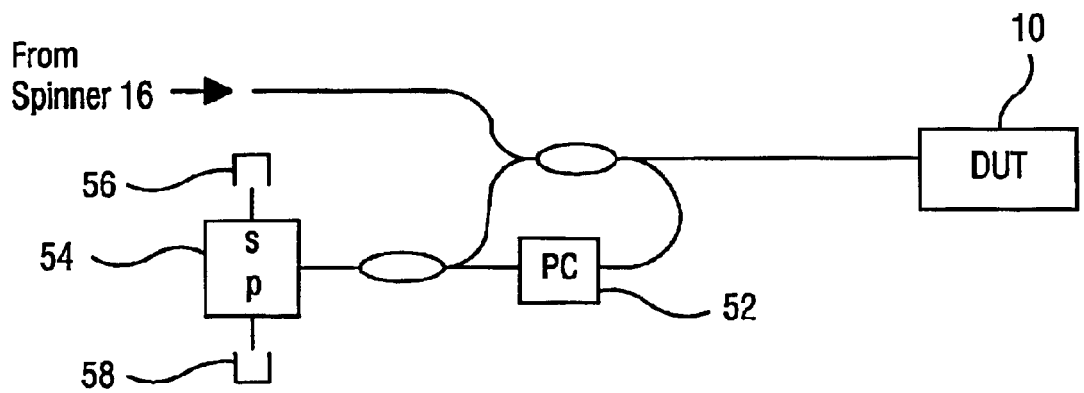
FIG. 10 is a schematic of one embodiment of the present invention with the Device Under Test.

Here, we will digress a moment to discuss the parameter, θ, and what might be done about it. FIG. 10 is a schematic of a fiber-optic network for the measurement of the reflection response of a DUT. The path through the polarization controller 52 is the reference path. The polarization controller is adjusted so that the fringes measured at the detectors are maximized. This adjustment must be made with the DUT disconnected, and the laser sweeping. With the fringes maximized, the system is described as being "aligned." An alternate alignment in which the fringes are nulled is also possible.

As shown in FIG. 10, we can insert a polarization controller 52 in the reference path, and use it to manipulate the polarization state of the incident field incident on the beam splitter.

If we zero out the return signal from the device under test (bend the lead fiber), The fields incident on the detectors are $$E_s \cdot E_s^* = \frac{1}{4}[1 - \sin(2\theta)\cos(\psi + \phi + \omega\tau_p)] \qquad \text{Eqn. 25}$$

and $$E_p \cdot E_p^* = \frac{1}{4}[1 + \sin(2\theta)\cos(\phi + \psi + \omega\tau_p)]. \qquad \text{Eqn. 26}$$

By adjusting the polarization controller 52 to achieve full contrast, θ is set to π/4+qπ/2 where q is an integer and represents an uncertainty in the sign of the trigonometric function. The detected fields are then given by, $$E_s \cdot E_s^* = \qquad \text{Eqn. 27}$$

$$\frac{1}{4}[1 \pm \cos(\psi + \phi + \omega\tau_p)] + \frac{1}{16}(|a|^2 + |b|^2 + 2Re[ab^*e^{i\omega\tau_p}]) +$$

$$\frac{1}{4\sqrt{2}}Re[(ae^{-i(\phi+k\pi)} - be^{i(\psi+l\pi)} +$$

$$be^{-i(\phi+k\pi+\omega\tau_p)} - ae^{i(\psi+l\pi+\omega\tau_p)})e^{-i\omega(\tau_D-\tau_{ref})}]$$

and $$E_p \cdot E_p^* = \qquad \text{Eqn. 28}$$

$$\frac{1}{4}[1 \mp \cos(\phi + \psi + \omega\tau_p)] + \frac{1}{16}[|c|^2 + |d|^2 + 2Re[cd^*e^{i\omega\tau_p}]] +$$

$$\frac{1}{4\sqrt{2}}Re[(ce^{-i(\psi-l\pi)} + de^{i(\phi-k\pi)} +$$

$$de^{-i(\psi-l\pi+\omega\tau_p)} + ce^{i(\phi-k\pi+\omega\tau_p)})e^{-i\omega(\tau_D-\tau_{ref})}]$$

where k and l are arbitrary integers.

Examining these detected signals it can be seen that the elements of the matrices have been shifted to separate locations in frequency space, with a phase shift. The relative phases between the elements in a Jones matrix are important and must be known to some degree as discussed later. So, by selecting terms based upon their location in frequency space, and, also making a best guess at the polarization spinner delay, r, we can extract the following field responses, $$E_a = ae^{i(\Psi+l\pi+\omega\Delta\tau_p)} \qquad \text{Eqn. 29}$$

$$E_b = be^{-i(\phi+k\pi+\omega\Delta\tau_p)} \qquad \text{Eqn. 30}$$

$$E_{ba} = ae^{-i(\phi+k\pi)} - be^{i(\Psi+l\pi)} \qquad \text{Eqn. 31}$$

$$E_c = ce^{i(\phi-k\pi+\omega\Delta\tau_p)} \qquad \text{Eqn. 32}$$

$$E_d = de^{-i(\Psi-l\pi+\omega\Delta\tau_p)} \qquad \text{Eqn. 33}$$

$$E_{dc} = ce^{-i(\Psi-l\pi)}de^{i(\phi-k\pi)} \qquad \text{Eqn. 34}$$

where we have allowed for an error in our estimate of the spinner delay of $\Delta\tau_p$. We immediately have expressions for all of the matrix elements, however, an arbitrary phase factor, some of it frequency dependent, is associated with the phase factor.

$$a = -E_n e^{-i(\Psi+l\pi+\omega\Delta\tau_p)} \qquad \text{Eqn. 35}$$

$$b = E_b e^{i(\phi+k\pi+\omega\Delta\tau_p)} \qquad \text{Eqn. 36}$$

$$c = E_c e^{-i(\phi-k\pi+\omega\Delta\tau_p)} \qquad \text{Eqn. 37}$$

$$d = E_d e^{i(\Psi-l\pi+\omega\Delta\tau_p)} \qquad \text{Eqn. 38}$$

Since we maximized the fringes that oscillate at a frequency of $\omega\tau_p$, we can easily determine $\tau_p$, for each scan, thus allowing for variations in the spinner path imbalance from scan to scan due to temperature. With the $\omega\tau_p$ term removed from the exponents, and any static phase error lumped into Ψ and φ, we can then construct the matrix, $$\begin{bmatrix} ae^{-i(\phi+k\pi)} & be^{i(\psi+l\pi)} \\ ce^{-i(\phi-l\pi)} & de^{i(\phi+k\pi)} \end{bmatrix} = \qquad \text{Eqn. 39}$$

$$\begin{bmatrix} e^{i\frac{\phi-\psi+(k-l)\pi}{2}} & 0 \\ 0 & e^{i\frac{\phi-\psi+(k-l)\pi}{2}} \end{bmatrix} \begin{bmatrix} a & b \\ c & d \end{bmatrix} \begin{bmatrix} e^{i\frac{\phi+\psi+(k+l)\pi}{2}} & 0 \\ 0 & e^{i\frac{\phi+\psi+(k+l)\pi}{2}} \end{bmatrix}$$

Note that the measured matrix can be obtained from the original matrix by multiplication with two unitary matrices. This is not a transformation of basis, because the two matrices are not inverses of one another. As a result, diagonalizing the measured matrix does not recover the original matrix. All of the important properties of the matrix, Polarization Mode Dispersion, Polarization Dependent Loss, Spectral Amplitude and Group Delay are all maintained. All that has been altered is the polarization state at which a given minimum or maximum will occur. Since polarization in optical fiber is rarely well controlled, this loss of information regarding the device is not detrimental to the vast majority of applications.

In the following embodiments, the mathematics describing the device performance is not substantially altered, although the elements used to implement the measurement are altered. These alterations involve the removal of elements from claims and are not obvious.

No Polarization-Maintaining Fiber Embodiment

The embodiment described above in FIGS. 1 and 10 contains a PM fiber coupler 22. Proper operation of the device requires that the splitting ratio of the coupler be very well matched. Obtaining PM couplers is difficult and expensive. Obtaining well matched PM couplers is much more difficult and expensive. Polarization-beam-combiners are also difficult and expensive to come by. It would, therefore, be advantageous to eliminate these elements from the invention, and replace them with more easily obtainable devices.

At the polarization beam combiner 20, the great circle on the Poincaré sphere through which the polarization state rotates is well defined. Once the light has propagated through a few meters of optical fiber, however, the fiber will have transferred the polarization states to a new and completely arbitrary great circle. As a result, the well defined states produced by the PM fiber system serve no useful purpose to the measurement. We are then free to choose any set of orthogonal states to send through the two different length paths.

As disclosed in U.S. Pat. No. 4,389,090 "Fiber Optic Polarization Controller," describes a simple apparatus that can be used to map any input polarization state to any other polarization state with little or no loss and little wavelength dependence. The polarization controller consists of three fiber loops that can be tilted independently, and is generally referred to as a set of LeFevre Loops after the inventor.

If we include a polarization controller of any kind (such as the LeFevre Loops discussed above) in a Mach-Zender Interferometer, we can adjust the controller such that the two states, when recombined at the coupler, are orthogonal to one another. This state of orthogonality is achieved by adjusting the polarization controller until one output of the coupler shows no fringes as the laser is tuned. The lack of interference fringes indicates that the two states of polarization entering the coupler through different paths have no common components, and are, therefore, orthogonal. With the creation of a polarization state that rotates rapidly through a: great circle on the Poincaré sphere as a function of wavelength, we have achieved an equivalent function to the PM fiber/ polarization-beam-combiner device described above. The remainder of the system then operates exactly as the previously described embodiment.

Figure 11:
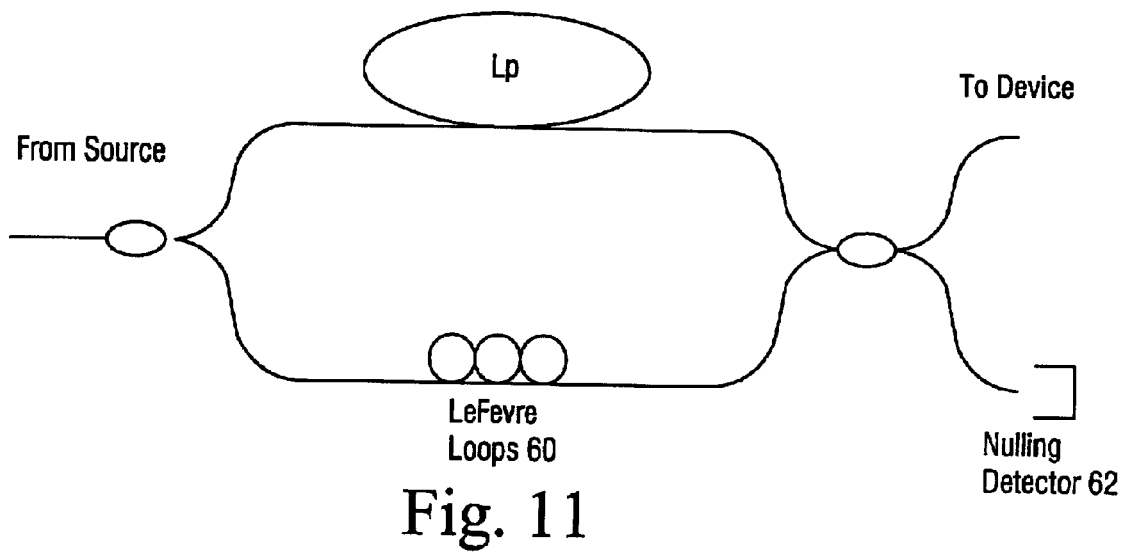
FIG. 11 is a schematic of a single-mode (SM) fiber spinner module.

FIG. 11 shows an all single-mode (SM) fiber (i.e. not PM fiber) spinner module. By adjusting the polarization controller (LeFevre Loops 60) until no fringes are observed on the nulling detector 62 as the laser is swept, orthogonality of the polarization states in both arms of the "spinner" is guaranteed. The polarization state in one arm is, however, completely arbitrary.

Calibration of a single Spinner Optical Vector Analyzer

Figure 18:
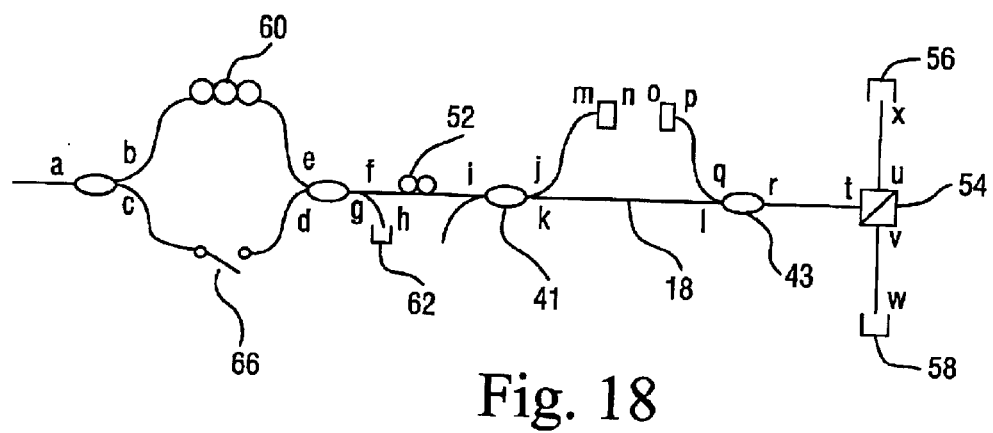
FIG. 18 is a schematic of a portion of the network of the invention illustrating calibration of the system.

In order to describe the calibration procedure, it will be necessary to reference specific points of the optical network within one embodiment of the optical vector analyzer. A schematic diagram of the relevant portion of the network appears in FIG. 18 where the couplers are 50/50 3 dB fused-tapered, wavelength flattened couplers. In order to calibrate out the nonideal characterizations of the system, it is necessary to temporarily break one optical path in the spinner embodiment shown in FIG. 18. An optical switch 66 is therefore placed in the c-d path so that this break can be made and the connection reestablished for normal operation. Additionally, although the polarization controller is shown in the fiber f-i, it could also be located at other positions such as the k-l fiber.

Before performing any measurements, and after aligning the optics, two measurement scans are conducted with no DUT attached. The first scan is done with the spinner switch open, and the DC signals on the detectors at points w and x are recorded. These DC signals are equal to the optical power incident on each detector multiplied by the gains of the detectors and their supporting electronics, and are frequency-dependent. We will denote them as $$S_w^{open}(\omega) = g_w(\omega) P_w^{open}(\omega) \qquad \text{Eqn. 40}$$

and $$S_x^{open}(\omega) = g_x(\omega) P_x^{open}(\omega) \qquad \text{Eqn. 41}$$

where P, g, and S refer to optical power, gain, and measured signal, respectively, and the subscripts refer to the two detectors. The superscript is a reminder that this information was acquired with the spinner switch open. In order for polarization-dependent loss to be properly calibrated, $g_w(\omega)$ and $g_x(\omega)$ must be equal. When the spinner switch is closed and a measurement is made, the optical signal at each detector will contain an AC term and a DC term:

$$S_w^{closed}(\omega)[P_w^{closed,\,dc}(\omega) + P_w^{closed,\,ac}(\omega)e^{i\omega\tau}] \qquad \text{Eqn. 42}$$

$$S_x^{closed}(\omega) = g_x(\omega)[P_x^{closed,\,dc}(\omega) + P_x^{closed,\,ac}(\omega)e^{i\omega\tau}] \qquad \text{Eqn. 43}$$

In the above expressions $\omega$ is the optical frequency and $\tau$ is the difference between the times for an optical signal to propagate from point b to point e and from point c to point d. By taking the Fourier transform of these signals, the AC and DC terms can be separated, and then inverse transforms will bring the information back into the frequency domain. We obtain the following information from this scan:

$$S_w^{closed,\,dc}(\omega) = g_w(\omega) P_w^{closed,\,dc}(\omega) \qquad \text{Eqn. 44}$$

$$S_x^{closed,\,dc}(\omega) = g_x(\omega) P_x^{closed,\,dc}(\omega) \qquad \text{Eqn. 45}$$

$$S_w^{closed,\,ac}(\omega) = g_w(\omega) P_w^{closed,\,ac}(\omega) \qquad \text{Eqn. 46}$$

$$S_x^{closed,\,ac}(\omega) = g_x(\omega) P_x^{closed,\,ac}(\omega) \qquad \text{Eqn. 47}$$

where the superscripts now indicate both (a) which peak of the Fourier transform was selected, and (b) that the spinner switch was closed during data acquisition. We now define the following calibration quantities derived from these two scans:

$$C_1(\omega) = \sqrt{S_w^{open}} e^{i(\angle S_w^{closed,\,ac} - \angle S_x^{closed,\,ac})} \qquad \text{Eqn. 48}$$

$$C_2(\omega) = \sqrt{S_x^{open}} \qquad \text{Eqn. 49}$$

$$C_3(\omega) = \sqrt{S_w^{closed,\,dc} - S_{w_{open}}} \qquad \text{Eqn. 50}$$

$$C_4(\omega) = \sqrt{S_x^{closed,\,dc} - S_{x_{open}}} \qquad \text{Eqn. 51}$$

Once the above information has been obtained, it will be used to divide all subsequent measurements in the following way. If the raw Optical Vector Analyzer Jones matrix measurement yields the matrix $$\begin{bmatrix} a(\omega) & b(\omega) \\ c(\omega) & d(\omega) \end{bmatrix} \qquad \text{Eqn. 52}$$

then the matrix that will be used for subsequent calculations will be $$\begin{bmatrix} a/C_1 & b/C_3 \\ c/C_2 & d/C_4 \end{bmatrix} \qquad \text{Eqn. 53}$$

During a measurement scan, the detector 62 at point h acquires data at the same time as the detectors 58 and 56 at points w and x, respectively. This data has the same form as Eqs. 42 and 43, and the AC component can be extracted in the same way. We will call this result $S_h^{ac}(\omega)$, and multiply the Jones matrix by the phase of $S_h^{ac}(\omega)$ as follows:

$$\begin{bmatrix} \frac{a}{C_1}e^{-iLS_h^{ac}} & \frac{b}{C_3}e^{-iLS_h^{ac}} \\ \frac{c}{C_2}e^{-iLS_h^{ac}} & \frac{d}{C_4}e^{-iLS_h^{ac}} \end{bmatrix} \qquad \text{Eqn. 54}$$

The next step in calibration is to perform a measurement using a fiber patchcord as the DUT. The resulting matrix, upon being divided by the calibration quantities as in Eqns. 48–51, is stored in memory and is called the reference matrix. It will be denoted as $$\overline{M}_R = \begin{bmatrix} \frac{a'}{C_1}e^{-iLS_h^{ac,}} & \frac{b'}{C_3}e^{iLS_h^{ac,}} \\ \frac{c'}{C_2}e^{-iLS_h^{ac,}} & \frac{d'}{C_4}e^{iLS_h^{ac,}} \end{bmatrix} \qquad \text{Eqn. 55}$$

Once the reference matrix has been acquired, the instrument is now considered to be calibrated. All subsequent measured matrices (in the form of Eqn. 54) are multiplied on the right by the inverse of $M_R$ to yield the final measured Jones matrix J for the DUT, where:

$$\overline{J} = \qquad \text{Eqn. 56}$$

$$\frac{1}{a'd' - b'c'} \begin{bmatrix} \frac{a}{C_1}e^{-iLS_h^{ac,}} & \frac{b}{C_3}e^{iLS_h^{ac,}} \\ \frac{c}{C_2}e^{-iLS_h^{ac,}} & \frac{d}{C_4}e^{iLS_h^{ac,}} \end{bmatrix} \begin{bmatrix} \frac{d'}{C_4}e^{-iLS_h^{ac,}} & -\frac{b'}{C_3}e^{iLS_h^{ac,}} \\ -\frac{c'}{C_2}e^{-iLS_h^{ac,}} & \frac{a'}{C_1}e^{iLS_h^{ac,}} \end{bmatrix}$$

All Coupler/Polarization Controller Embodiment

The polarization beam-splitter 54 remaining in the design in the description above not only adds cost, but places very tight restrictions on the coupler tolerances in the spinner interferometer. A problem with the above embodiment is that a polarization controller 52 and polarizing beam-splitter 54 would be required for each additional receiving channel if multiple detection channels were required.

Figure 12:
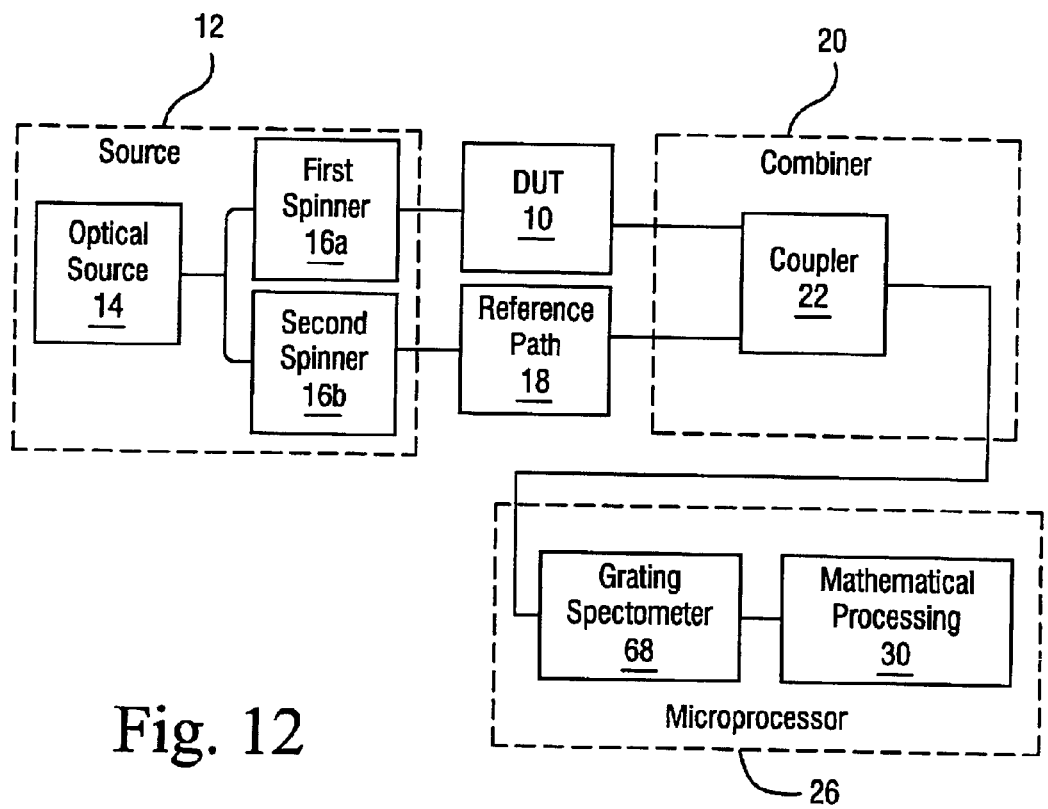
FIG. 12 is block diagram of a double spinner embodiment of the present invention.
Figure 13:
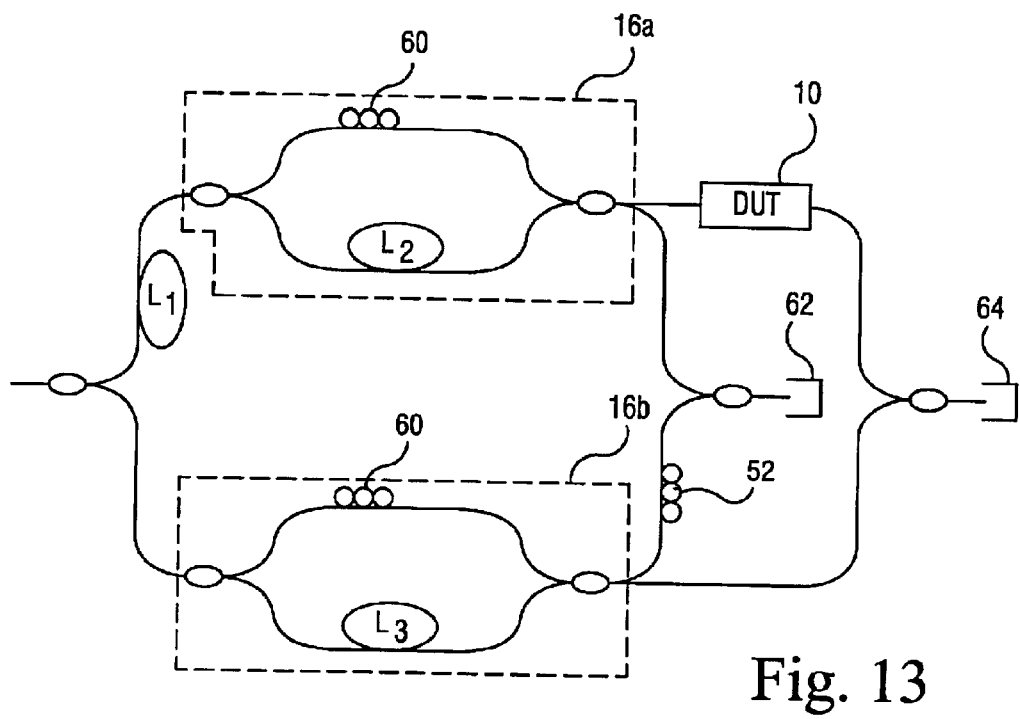
FIG. 13 is a schematic of one embodiment of the invention shown in FIG. 12.

These difficulties can be resolved using a double spinner embodiment without polarization control as shown in FIGS. 12 & 13. The light source 14 supplies either a varying frequency light (for example, from a tunable laser source sweeping through the frequency of interest) or a broadband light (including the frequency range of interest) to two spinners 16a and 16b. It is understood that the reference path in the form of the dotted line 13 (shown in FIG. 1) would be needed in the variable frequency light source embodiment, it has been eliminated from FIG. 12 to illustrate a broadband light embodiment with an optical spectrum analyzer (OSA), in this instance a grating spectrometer 68. Other OSA's include a Fourier-Transform spectrometer and a scanning Fabry-Perot spectrometer.

In the FIGS. 12 & 13 embodiments, the output of each spinner provides light whose polarization varies linearly with frequency, the difference between the two spinners is that the rate of change of polarization with respect to a change in frequency is different. This difference in the rate of change can be defined by a path length difference, or other characteristics of the spinner.

The outputs of spinners 16a and 16b are applied to the DUT 10, and the reference path 18, respectively. The two outputs are connected to the coupler 22 with the output detected and applied to the microprocessor 26 as before. However, because of the difference in polarization rate of change, there is no need to utilize a polarizer in the processing of the outputs. As with the embodiment of FIG. 1, if the narrow linewidth source, such as a tunable laser, is used, a light sample is supplied to the spectral acquisition block 28.

One specific embodiment of the double spinner optical vector analyzer is shown in FIG. 13. One Mach-Zender interferometer is used for each spinner. One arm serves as the reference, and the other arm includes the device under test. Each interaction between the four polarizations can be made to have a unique apparent location in the transform of the interferometer fringes. In the FIG. 13 embodiment of the present invention, there is shown a coupler/polarization-controller network for full Jones matrix measurements measured by single device detector 64. Although adjustment of the fringes is not absolutely necessary, in a preferred embodiment, the interference terms occurring at L1, L1+L2, L1–L3 and L1–L3+L2 on detector 62 are adjusted to be non-zero using polarization controller 52.

Two of the polarization interactions are between different arms of the same spinner interferometer. These interactions are nulled using the polarization controllers in the interferometers (shown as LeFevre Loops 60 to distinguish from the nulling polarization controller 52 although they may all be LeFevre Loops). There are then four interactions remaining, and the four interactions are measurements of the four Jones matrix elements. Each matrix element is scaled by constant. These scaling values can be measured relatively easily, a and, since they are determined by coupler splitting-ratios and splice losses, they should be stable over very long periods of time. The ability to calibrate each path loss out of the measurement should make it possible to obtain PDL measurements accurate to better than 0.05 dB.

Figure 14:
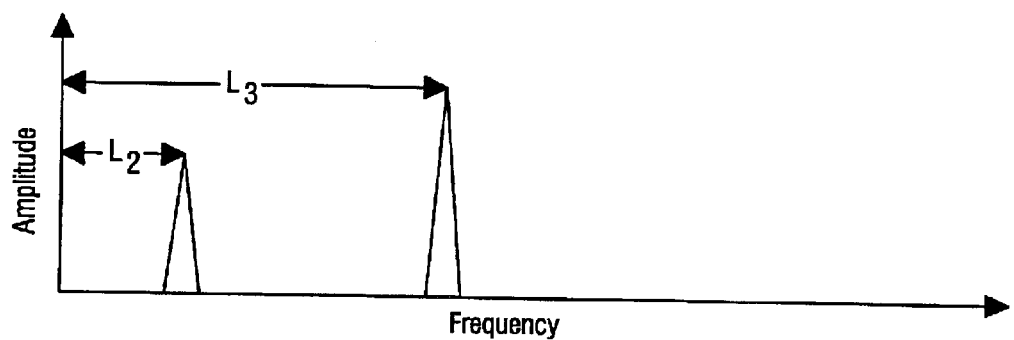
FIG. 14 is a graph of amplitude versus frequency of Fourier transforms of interference in the L2 and L3 interferometers.

FIG. 14 is an illustration of the amplitude versus frequency of the Fourier transform of the two peaks resulting from interference in the smaller interferometers in FIG. 13. By making the differential delay in each interferometer different, due to the increased path length of L1, the interference terms for each is readily separable.

A further advantage of this measurement method is the ability to use a single detector 64 for the measurement. As a result, gain matching between multiple detectors is not an issue, and relatively low precision (adjustable gain) components can be used. The use of a single device detector 64 also reduces the channel count required for a functioning system from four to three, meaning that a standard 4-channel board will now support a transmission and return-loss measurement.

Figure 15:
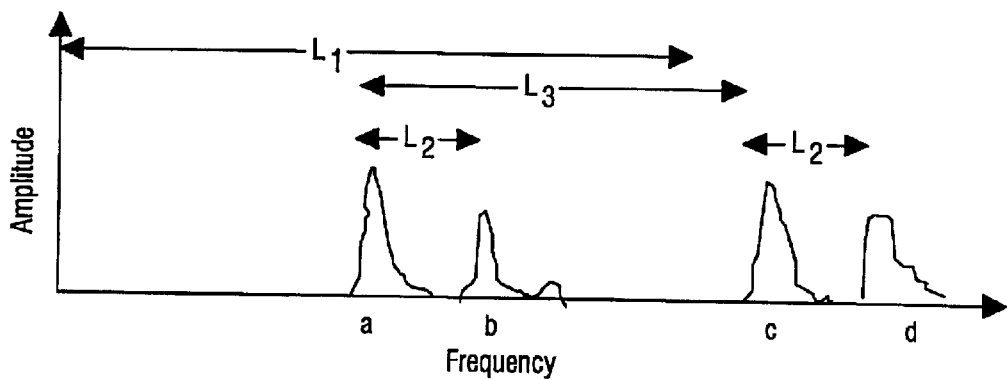
FIG. 15 is a graph of amplitude versus frequency for Fourier transforms of interference fringes at the detector.

FIG. 15 shows the amplitude versus frequency of the Fourier transform of the interference fringes at the device detector 64. Note that the differential delays for each of the small interferometers must be unequal to prevent the overlap of matrix terms, and that the optimal difference is that one delay should be twice the other. The spectral matrix entries are obtained by applying an inverse Fourier transform to each of the time domain responses.

Including all four elements in a single channel measurement does have the disadvantage of requiring more temporal range, and greater separation between the device, and any possible reflections (primarily connector reflections). In general, if a five nanosecond (5 ns) response is allowed (equivalent to 200 Mz sample spacing), then the fiber leads must be a minimum of 2 meters long. 3 meter leads would permit a 7 ns response time.

Scalability-Multiple Test Station Architecture

Figure 16:
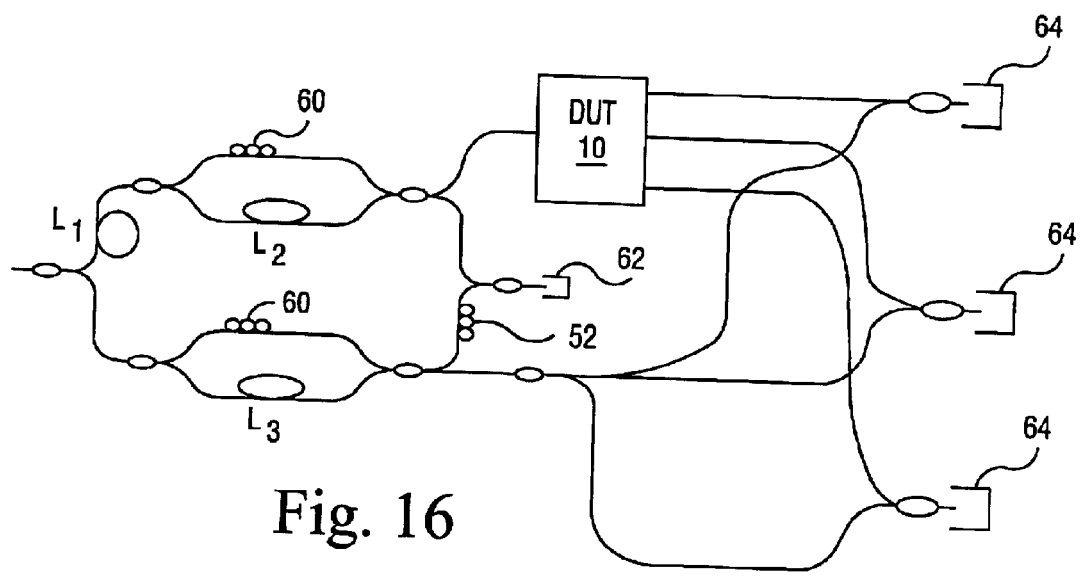
FIG. 16 is a schematic of a further embodiment of the present invention.

Because the double-Mach-Zender configuration of FIG. 13 does not have any defined polarization states, and thus no polarization controller associated with the measurement detector, it is easily scalable. Perhaps the first way in which this scaling can be applied would be to measure multiple outputs of a single device such as a Dense Wavelength Division Multiplexer (DWDM), a de-multiplexer, or an optical switch. FIG. 16 is a schematic of a single source, multiple detector, Jones matrix measurement system. Note that each additional detection channels require only a coupler and a detector 64, and no polarizing or polarization control elements.

Figure 17:
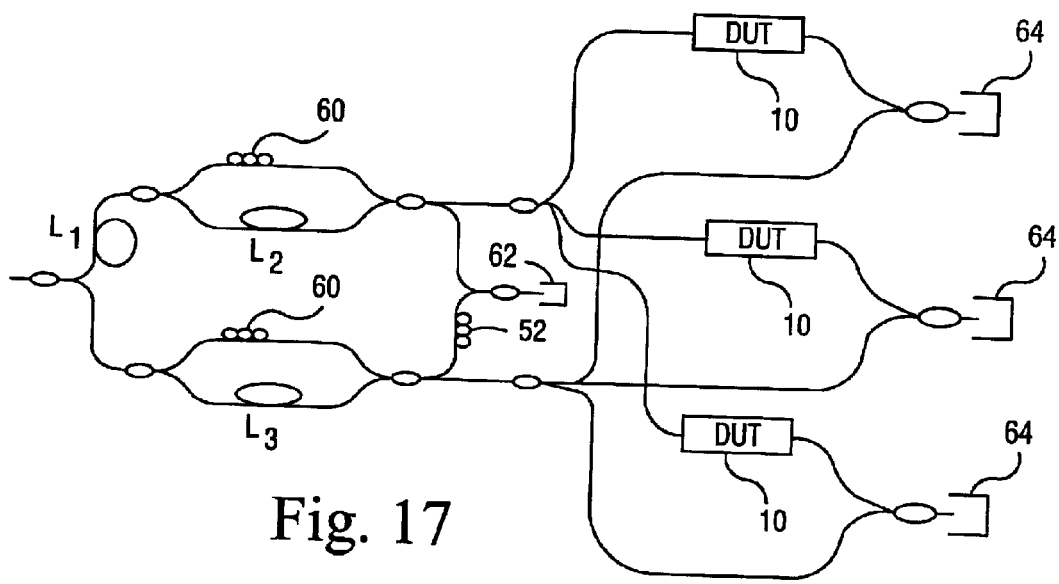
FIG. 17 is a schematic of a still further embodiment of the present invention.

A second application of the scalability of the double-Mach-Zender configuration would be to distribute the source light and the measurement light to multiple measurement stations for a plurality of devices under test (DUT 10) in a single facility. In this way the cost of the laser could be spread over multiple measurement stations, resulting in an extremely cost effective solution. FIG. 17 is a schematic of a multiple device/single source Jones Matrix measurement system. Note that each additional detection channel requires only a coupler and a detector, and no polarizing or polarization control elements.

In the view of the various embodiments and discussion of the present invention noted above, many variation and subsitutions of elements for those disclosed will be obvious to one or ordinary skill in the art. Accordingly, the invention is limited only by the claims appended hereto.

I claim:

1. An optical vector analyzer for analyzing the characteristics of a fiber-optic device under test (DUT) over a frequency range of interest, comprising:

a source of light having an optical frequency content over said frequency range of interest, for feeding a spinner, said spinner configured to provide a spinner light output having a polarization state which varies linearly with said frequency range, said spinner light output coupled as an input to both said DUT and a reference path;

a beam combiner for adding combining a light output from said reference path and a light output from said DUT for a plurality of frequencies in said frequency range of interest and providing an output indicative of optical power, in two orthogonal polarization states, of said combined light; and microprocessor responsive to said power outputs and programmed to:

digitize said power outputs over a plurality of frequencies in said frequency range of interest, derive respective curves from said digitized power outputs, calculate the Fourier transform of said respective curves, and derive from said Fourier transforms, one or more arrays of constants for a Jones matrix, thereby characterizing said device under test.

2. An optical vector analyzer according to claim 1, wherein said source of light is comprised of a narrow linewidth tunable source of light.

3. An optical vector analyzer according to claim 2, wherein said tunable source of light is a tunable laser.

4. An optical vector analyzer according to claim 3, wherein said microprocessor is also, responsive to said source of light.

5. An optical vector analyzer according to claim 1, wherein said source of light is a broadband optical source.

6. An optical vector analyzer according to claim 1, wherein said beam combiner of includes:

a coupler adding the reference path output and the DUT output; and a polarizer splitting the added outputs into said two orthogonal polarized outputs.

7. An optical vector analyzer according to claim 6, wherein said coupler is a bulk-optic beam splitter.

8. An optical vector analyzer according to claim 6, wherein said coupler is a fused tapered coupler.

9. An optical vector analyzer according to claim 1, wherein said microprocessor includes a spectral acquisition device for measuring the optical power of the light in the two orthogonal polarization states.

10. An optical vector analyzer according to claim 1, wherein said microprocessor includes an optical spectrum analyzer for measuring the optical power output in the frequency range of interest.

11. An optical vector analyzer according to claim 9; wherein said source of light is a tunable laser-, and a sample of said laser light is provided to said spectral acquisition device, said spectral acquisition device including:

a Michelson interferometer supplied with said laser light sample for generating a trigger light signal;

a trigger detector, responsive to said trigger light signal, providing a power acquisition trigger signal; and two power detectors, each power detector measuring the optical power in one of said tow orthogonal polarization states.

12. An optical vector analyzer according to claim 11, wherein said interferometer includes:

a two way coupler for splitting said laser light sample into two optical signals;

two optical paths, each path having two ends, one of said two ends receiving one of said two optical signals from said coupler, one of said optic paths is longer than the other of said optical paths; and two Faraday rotator mirrors, one of said mirrors connected to the other end of each of said two optical paths, wherein said laser light sample is phase delayed in said longer path relative to the shorter path and reflected by said mirrors back to said coupler, wherein said reflected signals are combined and are coupled to said trigger detector.

13. An optical vector analyzer according to claim 12, wherein said spectral acquisition device further includes:

a coupler to provide a portion of said laser light sample; and a frequency monitor, responsive to said portion of said laser light sample, for providing an output indicative of the wavelength of said laser light sample.

14. An optical vector analyzer according to claim 1, wherein said combiner includes:

a polarization controller for adjusting the polarization of the recombined portions of light;

a polarizing beam splitter, responsive to said polarization controller, for splitting said recombined light into x- and y- polarization components; and s- and p- detectors, responsive to said x- and y- polarization components, respectively, for providing an electrical signal indicative of the amplitude of the x- and y- polarization components.

15. An optical vector analyzer according to claim 14, wherein said polarization controller is adjustable to provide a nulled alignment in which the relative phase of the two states of polarization at the coupler does not affect a power splitting ratio at said polarization beam splitter.

16. An optical vector analyzer according to claim 14, wherein said polarization controller is adjustable to provide a maximum contrast alignment in which the relative phase of the two states of polarization at the coupler provides a maximum amount of power at one of the detectors and, at the same time, provides a minimum amount of power at the other of the detectors.

17. A spinner for modifying light from a source into light having a polarization which varies linearly with respect to variations in optical frequency of the source light over a frequency range of interest, said spinner comprising:

a splitter for splitting said light from said source into two portions of light;

two separate light paths, each path supplied with a portion of said light, each light path having a Jones matrix which is independent of wavelength of said light, each path having a Jones matrix different from the Jones matrix of the other path such that, at the end of each path, light transmitted along the two paths is mutually orthogonal, and a spinner combiner for combining light from said two paths, where a combined light output has a polarization state which varies linearly with frequency variation of said light from said source.

18. A spinner according to claim 17, wherein said splitter comprises a polarization maintaining coupler for splitting said light from said source.

19. A spinner according to claim 17, wherein said splitter comprises a single mode coupler for splitting said light from said source.

20. A spinner according to claim 17, wherein said spinner includes at least one polarizer controller, located in at least one of said two paths, for controlling polarization in at least one of said two paths to provide mutually orthogonal light at the spinner combiner.

21. A spinner according to claim 20, wherein a portion of the combiner output is provided to a nulling detector for providing an electrical output indicative of the phase relationship of light in said two paths.

22. An optical vector analyzer for analyzing the characteristics of a fiber-optic device under test (DUT) over a frequency range of interest, comprising:

(a) a narrow linewidth tunable source of light for providing a varying optical frequency light over said frequency range of interest, said light having an initial polarization, (b) a spinner, supplied with said light, including:
(1) a splitter for splitting said light from said source into two portions of light;
(2) two separate light paths, one path comprising a long path and the other path comprising a short path relative to said long path, each path supplied with one portion of said light, each light path having a Jones matrix which is independent of wavelength of said light, each path having a Jones matrix different from the Jones matrix of the other path such that, at the end of each path, light transmitted along the two paths is mutually orthogonal,
(3) a spinner combiner for combining light from said two paths, where, as a result of the path length difference, a combined light output from the combiner has a polarization state which varies linearly with frequency variation of said light from said source, said light provided as an input to both said DUT and a reference path;

(c) a beam combiner for adding light from said reference path and from said DUT for a plurality of frequencies in said frequency range of interest and for providing an output indicative of optical power, in two orthogonal polarization states, of said combined light;

(d) a spectral acquisition unit for measuring said optical power with respect to wavelength for said plurality of frequencies; and (e) a microprocessor, responsive to said measured power and programmed to:
(1) digitize said measured power for said frequencies,
(2) derive respective curves from said digitized power measurements, and (3) calculate the Fourier transform of said respective curves, and
(4) derive from said Fourier transforms, one or more arrays of constants for said Jones matrix, thereby characterizing said device under test.

23. An optical vector analyzer according to claim 22, wherein said tunable source of light is includes a laser.

24. An optical vector analyzer according to claim 22, wherein said splitter comprises a polarization maintaining coupler for splitting said light from said source.

25. An optical vector analyzer according to claim 22, wherein said splitter comprises a single mode coupler for splitting said light from said source.

26. An optical vector analyzer according to claim 22, wherein said spinner includes at least one polarizer controller, located in at least one of said two paths, for controlling polarization in at least one of said two paths to provide mutually orthogonal light at the spinner combiner.

27. An optical vector analyzer according to claim 22, wherein a portion of the combiner output is provided to a nulling detector for providing an electrical output indicative of the phase relationship of light in said two paths.

28. An optical vector analyzer according to claim 22, wherein said beam combiner includes:

a coupler for adding the reference path output and the DUT output; and a polarizer for splitting the added outputs into said two orthogonal polarized outputs.

29. An optical vector analyzer according to claim 22, wherein said combiner includes:

a polarization controller for adjusting the polarization of the recombined portions of light;

a polarizing beam splitter, responsive to said polarization controller, for splitting said recombined light into x- and y- polarization components; and s- and p- detectors, responsive to said x- and y- polarization components, respectively, for providing an electrical signal indicative of the amplitude of the x- and y- polarization components.

30. An optical vector analyzer according to claim 29, wherein said polarization controller is adjustable to provide a maximum contrast alignment in which the relative phase of the two states of polarization at the coupler provides a maximum amount of power at one of the detectors and, at the same time, provides a minimum amount of power at the other of the detectors.

31. An optical vector analyzer according to claim 22, wherein said coupler is a fused tapered coupler.

32. An optical vector analyzer according to claim 22, wherein said microprocessor includes a spectral acquisition device for measuring the optical power of the light in the two orthogonal polarization states.

33. An optical vector analyzer according to claim 32, wherein said source of light is a tunable laser-, and a sample of said laser light is provided to said spectral acquisition device, said spectral acquisition device includes:

a Michelson interferometer supplied with said laser light sample for generating a trigger light signal;

a trigger detector, responsive to said trigger light signal, providing a power acquisition trigger signal; and two power detectors, each power detector measuring the optical power in one of said tow orthogonal polarization states.

34. An optical vector analyzer according to claim 33, wherein said interferometer includes:

a two way coupler for splitting said laser light sample into two optical signals;

two optical paths, each path having two ends, one of said two ends receiving one of said two optical signals from said coupler, one of said optic paths is longer than the other of said optical paths; and two Faraday rotator mirrors, one of said mirrors connected to the other end of each of said two optical paths, wherein said laser light sample is phase delayed in said longer path relative to the shorter path and reflected by said mirrors back to said coupler, wherein said reflected signals are combined and are coupled to said trigger detector.

35. An optical vector analyzer according to claim 34, wherein said spectral acquisition device further includes:

a coupler to provide a portion of said laser light sample; and a frequency monitor, responsive to said portion of said laser light sample, for providing an output indicative of the wavelength of said laser light sample.

36. An optical vector analyzer for analyzing the characteristics of a fiber-optic device under test (DUT) over a frequency range of interest, comprising:

(a) a source of broadband light having a frequency band over said frequency range of interest, said light having an initial polarization, (b) a spinner, supplied with said light, including:
   (1) a splitter for splitting said light from said source into two portions of light;
   (2) two separate light paths, one path comprising a long path and the other path comprising a short path relative to said long path, each path supplied with one portion of said light,
   (3) a spinner combiner for orthogonally combining light from said two paths, where, as a result of the path length difference, a combined light output from the combiner has a polarization state which varies linearly with frequency of said light from said source, said light provided as an input to both said DUT and a reference path;

(c) a beam combiner for adding light from said reference path and from said DUT for a plurality of frequencies in said frequency range of interest and providing a beam combiner output;

(d) an optical spectrum analyzer, responsive to said beam combiner output, for achieving a minimum resolution bandwidth of no more than one fourth the bandwidth of said frequency range of interest and providing an output; and (e) a microprocessor, responsive to said spectrum analyzer output and programmed to:
   (1) derive respective curves from said analyzer output;
   (2) calculate the Fourier transform of said respective curves, and
   (3) derive from said Fourier transforms, one or more arrays of constants for a Jones matrix, thereby characterizing said device under question test.

37. An optical vector analyzer according to claim 36, wherein said splitter comprises a polarization maintaining coupler for splitting said light from said source.

38. An optical vector analyzer according to claim 36, wherein said splitter comprises a single mode coupler for splitting said light from said source.

39. An optical vector analyzer according to claim 36, wherein said spinner includes at least one polarizer controller, located in at least one of said two paths, for controlling polarization in at least one of said two paths to provide mutually orthogonal light at the spinner combiner.

40. An optical vector analyzer according to claim 39, wherein a portion of the combiner output is provided to a nulling detector for providing an electrical output indicative of the phase relationship of light in said two paths.

41. An optical vector analyzer according to claim 36, wherein said beam combiner includes:

a coupler for adding the reference path output and the DUT output; and a polarizer for splitting the added outputs into said two orthogonal polarized outputs.

42. An optical vector analyzer according to claim 36, wherein said combiner includes:

a polarization controller for adjusting the polarization of the recombined portions of light;

a polarizing beam splitter, responsive to said polarization controller, for splitting said recombined light into x- and y- polarization components; and s- and p- detectors, responsive to said x- and y- polarization components, respectively, for providing an electrical signal indicative of the amplitude of the x- and y- polarization components.

43. An optical vector analyzer according to claim 36, wherein said optical spectrum analyzer includes a grating spectrometer.

44. An optical vector analyzer according to claim 36, wherein said microprocessor includes a spectral acquisition device for measuring the optical power of the light in the two orthogonal polarization states.

45. An optical vector analyzer for analyzing the characteristics of a fiber-optic device under test (DUT) over a frequency range of interest, comprising:

(a) a source of light having an optical frequency content over said frequency range of interest, said source of light providing two mutually coherent light beams, each of said light beams feeding a spinner for providing a spinner light output having a polarization state which varies linearly with said frequency, and said spinner light outputs having different rates of change of polarization with respect to change of frequency of the light beam, one of said spinner light outputs comprises an input to said DUT and the other of said spinner light outputs comprises an input to a reference path;

(b) a beam combiner for combining light output from said reference path and light output from said DUT over said frequency range of interest and providing a detected output; and (c) a microprocessor, responsive to said detected output and programmed to
   (1) digitize said detected output over a plurality of frequencies at said frequency range of interest,
   (2) derive respective curves from said digitized outputs,
   (3) calculate the Fourier transform of said respective curves, and
   (4) derive from said Fourier transforms, one or more arrays of constants for a Jones matrix, thereby characterizing said device under test.

46. An optical vector analyzer according to claim 45, wherein a portion of the combiner output is provided to a nulling detector for providing an electrical output indicative of the phase relationship of light in said two paths.

* * * * *